US012175674B1

(12) United States Patent
Hughes et al.

(10) Patent No.: US 12,175,674 B1
(45) Date of Patent: Dec. 24, 2024

(54) PREDICTING PARASPINAL MUSCLE SARCOPENIA USING MAGNETIC RESONANCE IMAGING

(71) Applicant: Tissue Connect Systems, Inc., Garden City, NY (US)

(72) Inventors: Alexander P. Hughes, New York, NY (US); Frank Cammisa, Greenwich, CT (US); Andrew Sama, Greenwich, CT (US); Federico Girardi, New York, NY (US); Artine Arzani, Arcadia, CA (US); Kyle Finos, Bruce Township, MI (US); Isaac Nathoo, Piscataway, NJ (US)

(73) Assignee: Tissue Connect Systems, Inc., Garden City, NY (US)

( * ) Notice: Subject to any disclaimer, the term of this patent is extended or adjusted under 35 U.S.C. 154(b) by 0 days.

(21) Appl. No.: 18/470,269

(22) Filed: Sep. 19, 2023

(51) Int. Cl.
*G06T 7/00* (2017.01)
*G06T 7/174* (2017.01)

(52) U.S. Cl.
CPC ............ *G06T 7/0012* (2013.01); *G06T 7/174* (2017.01); *G06T 2207/10088* (2013.01); *G06T 2207/20084* (2013.01)

(58) Field of Classification Search
CPC .................. G06T 7/0012; G06T 7/174; G06T 2207/10088; G06T 2207/20084
See application file for complete search history.

(56) References Cited

U.S. PATENT DOCUMENTS

2023/0111306 A1* 4/2023 Anand ................. G06T 7/0014
382/128
2023/0289967 A1* 9/2023 Jalal ..................... G06T 7/0012

OTHER PUBLICATIONS

Wesselink et al. NPL "Convolutional neural networks for the automatic segmentation of lumbar paraspinal muscles in people with low back pain" (Year: 2022).*
Z et al. NPL ("Development and validation of an automated image-based deep learning platform for sarcopenia assessment in head and neck cancer") (Year: 2023).*
(Continued)

*Primary Examiner* — Vu Le
*Assistant Examiner* — Winta Gebreslassie
(74) *Attorney, Agent, or Firm* — Goodwin Procter LLP

(57) ABSTRACT

The present disclosure provides methods and systems for measuring paraspinal muscle parameters using MRI. Two-dimensional MRI image slices of a subject's spine may be obtained. A slice selection model may identify one or more representative slices, each located at or adjacent to a physiological region corresponding to a specific biomechanical environment in a respective spine level of the subject's spine. A muscle segmentation model may segment each representative slice. Segmenting a representative slice may include generating an image segmentation mask including a plurality of pixels in the representative slice corresponding to paraspinal muscle and excluding a plurality of pixels in the representative slice corresponding to metal artifacts and/or to biological matter other than paraspinal muscle. A measurement extraction model may extract measurements of one or more parameters of the subject's paraspinal muscle based on the plurality of pixels included in the generated image segmentation masks of the representative slices.

27 Claims, 11 Drawing Sheets

(56) References Cited

OTHER PUBLICATIONS

Antico et al. NPL Deep Learning-Based Automatic Segmentation for Reconstructing Vertebral Anatomy of Healthy Adolescents and Patients With Adolescent Idiopathic Scoliosis (AIS) Using MRI Data (Year: 2021).*

Wei et al. NPL Risk factors for screw loosening in patients with adult degenerative scoliosis: the importance of paraspinal muscle degeneration (Year: 2021).*

Wang et al. NPL "A multi-resolution approach for spinal metastasis detection using deep Siamese neural networks". (Year: 2017).*

He et al. NPL "Transformers in medical image analysis" (Year: 2023).*

Wesselink et al. (Convolutional neural networks for the automatic segmentation of Lumbar paraspinal muscles in people with low back pain). (Year: 2022).*

Chiapparelli E., et al., "The association between lumbar paraspinal muscle functional cross-sectional area on MRI and regional volumetric bone mineral density measured by quantitative computed tomography," Osteoporos Int. Dec. 2022;33(12):2537-2545.

Haffer, H., et al., "Osteosarcopenia in the Spine Beyond Bone Mineral Density: Association Between Paraspinal Muscle Impairment and Advanced Glycation Endproducts," Spine (Phila Pa 1976). Jul. 15, 2023;48(14):984-993.

Moser, M. et al., "Changes in psoas and posterior paraspinal muscle morphology after standalone lateral lumbar interbody fusion: a quantitative MRI-based analysis," Eur Spine J. May 2023;32(5):1704-1713.

Moser, M. et al., "Preoperative Association Between Quantitative Lumbar Muscle Parameters and Spinal Sagittal Alignment in Lumbar Fusion Patients," Spine (Phila Pa 1976). Dec. 1, 2022;47(23):1675-1686.

Moser, M., "The predictive value of psoas and paraspinal muscle parameters measured on MRI for severe cage subsidence after standalone lateral lumbar interbody fusion," Spine J. Jan. 2023;23(1):42-53.

Muellner M, et al., "Changes of the posterior paraspinal and psoas muscle in patients with low back pain: a 3-year longitudinal study," Eur Spine J. Sep. 2023;32(9):3290-3299.

Muellner, M. et al., "Paraspinal musculature impairment is associated with spinopelvic and spinal malalignment in patients undergoing lumbar fusion surgery," Spine J. Dec. 2022;22(12):2006-2016.

Muellner, M. et al., "The association between paraspinal muscle parameters and vertebral pedicle microstructure in patients undergoing lumbar fusion surgery," Int Orthop. Apr. 2023;47(4):1051-1060.

Muellner, M., et al., "Differences in lumbar paraspinal muscle morphology in patients with sagittal malalignment undergoing posterior lumbar fusion surgery," Eur Spine J. Nov. 2022;31(11):3109-3118.

Muellner, M., et al., "The effect of age on psoas and paraspinal muscle morphology in patients undergoing posterior lumbar fusion surgery," Eur Spine J. Oct. 2022;31(10):2619-2628.

Schonnagel, L., et al., "Abdominal aortic calcification is independently associated with increased atrophy and fatty infiltration of the lumbar paraspinal muscles: a retrospective cross-sectional study," Eur Spine J. Sep. 2023;32(9):3002-3008.

Caffard et al., "Association between severity of the cervical foraminal stenosis and paraspinal muscle parameters in patients undergoing anterior cervical discectomy and fusion," J Neurosurg Spine. Dec. 22, 2023; 40(3):274-281.

Caffard et al., "Association between Cervical Sagittal Alignment and Subaxial Paraspinal Muscle Parameters," Spine (Phila Pa 1976). Dec. 15, 2023.

Moser et al., "Correlation between MRI-based spinal muscle parameters and the vertebral bone quality score in lumbar fusion patients," Brain Spine. Sep. 30, 2023; 3:102684.

Muellner et al., "Fat infiltration of the posterior paraspinal muscles is inversely associated with the fat infiltration of the psoas muscle: a potential compensatory mechanism in the lumbar spine," BMC Musculoskeletal Disorders. Oct. 27, 2023; 24(1):846.

Schönnagel et al., "Examining the Role of Paraspinal Musculature in Post-Operative Disability after Lumbar Fusion Surgery for Degenerative Spondylolisthesis," Spine (Phila Pa 1976). Oct. 5, 2023.

Schönnagel et al., "Relationship between lumbar spinal stenosis and axial muscle wasting," The Spine Journal. Oct. 1, 2023; 24(2):231-238.

Schönnagel et al., "Understanding the Interplay Between Paraspinal Muscle Atrophy and Lumbar Endplate Degeneration: A 3-Year Longitudinal Study," SPINE (Phila Pa 1976). Dec. 1, 2023; 48(23):1627-1634.

* cited by examiner

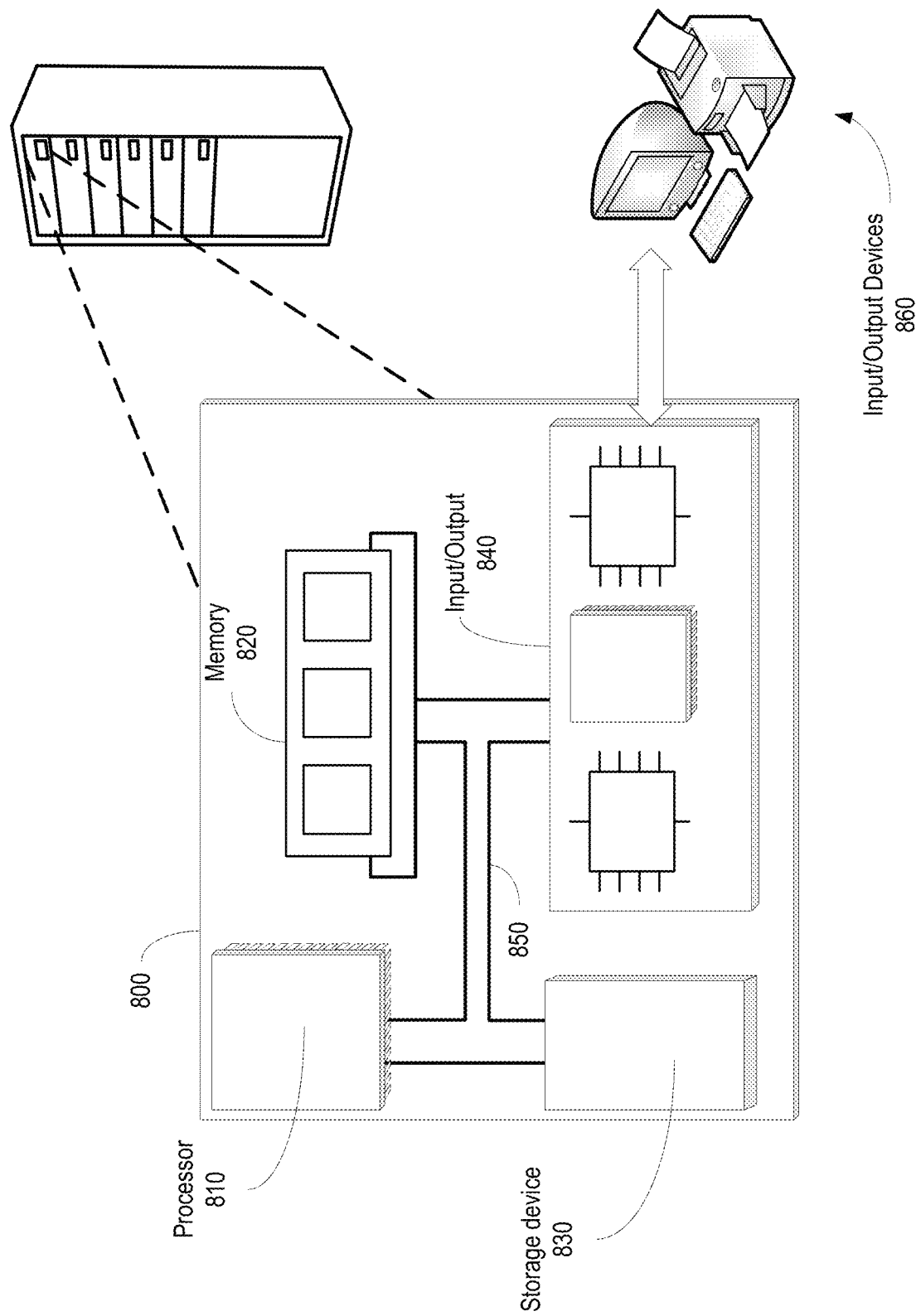

PREDICTING PARASPINAL MUSCLE SARCOPENIA USING MAGNETIC RESONANCE IMAGING

FIELD OF TECHNOLOGY

The present disclosure relates generally to measuring paraspinal muscle parameters, and more specifically, to techniques for using magnetic resonance imaging (MRI) to measure parameters of a subject's paraspinal muscles.

BACKGROUND

The integrity of the spinal components plays an important role in spine function. When the spinal unit of a vertebral body and its supporting structures of paraspinal muscle, ligaments, and tendons are functioning normally, the system of structures working in concert can withstand forces greater than a thousand times the load to failure of the individual components in isolation. Compromise of the components of the spinal unit can lead to increased pain, fracture risk, spinal instability, and increased complications following spinal surgery.

Currently the only standardized methodology for assessing the integrity of the spinal unit relies on bone mineral assessments of the vertebral body. Bone density assessments using both dual energy X-ray absorptiometry (DEXA) and quantitative computed tomography (q-CT) give an estimation of the mineral content within the vertebral body. There are currently no standardized methodologies for assessing the other soft tissue components of the spinal unit.

Recent research efforts have turned to magnetic resonance imaging (MRI) to develop methodologies to measure paraspinal muscle parameters. Parameters such as functional cross section area (FCSA) and fatty infiltration (FI) have been shown to predict low back pain. Fat distribution and fat characteristics within the posterior paraspinal muscles further reflect the evolution of the functional muscle unit in the setting of age and degenerative disease states. Aging and disease states not only affect the total FI but also affect the distribution pattern of fat within the individual posterior paraspinal muscles differently. The posterior spinal muscle groups can be broken down into the multifidus (MF) group and erector spinal (ES) group. The MF develops both hilar (medial) FI and marble FI within the substance of the muscle. The ES accumulates marble FI throughout the muscle. Furthermore, there are individual variations of the health of the individual myocytes within the muscle groups.

Traditionally, MRI-based muscle images are pixelated and tissue-specific threshold levels are set to distinguish among muscle, fat, and fascia. Numeric computing programs can then calculate FCSA and FL. However, traditional methodologies of MRI-based assessment of paraspinal muscles are prone to error due to inconsistency and variability of MRI slice selection. Furthermore, traditional methodologies for assessing fat distribution and Sobel index using pattern recognition techniques are error prone and unreliable.

Magnetic resonance imaging quality and reliability is negatively impacted by the presence of metallic implants in the subject. Spinal implants, a common feature of subjects with significant spinal pathology, cause a halo effect that degrades the ability to interpret the pixelated images using traditional software.

Traditional segmentation techniques based on pixelation of images and threshold setting to differentiate fat and lean muscle do not provide reliable and reproducible quantitative geographic mapping of fat patterns and distribution within the muscle. Such techniques do not reliably classify muscles into distribution models.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

According to an aspect of the present disclosure, a method for measuring paraspinal muscle parameters includes obtaining a plurality of magnetic resonance imaging (MRI) 2-dimensional image slices of a spine of a subject; identifying, by a slice selection model, one or more representative slices in the plurality of MRI slices, each of the one or more representative slices being located at or adjacent to a specified physiological region corresponding to a specific biomechanical environment in a respective spine level of the spine of the subject; segmenting, by a muscle segmentation model, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and extracting, by a measurement extraction model 230, one or more measurements of one or more respective parameters of the paraspinal muscle of the subject based on the plurality of pixels included in the generated image segmentation mask of each of the one or more representative slices.

According to another aspect of the present disclosure, a system for measuring paraspinal muscle parameters includes one or more processing devices; and one or more memory devices storing instructions which, when executed by the one or more processing devices, cause the system to perform operations. The operations include obtaining a plurality of magnetic resonance imaging (MRI) 2-dimensional image slices of a spine of a subject; identifying, by a slice selection model, one or more representative slices in the plurality of MRI slices, each of the one or more representative slices being located at or adjacent to a specified physiological region corresponding to a specific biomechanical environment in a respective spine level of the spine of the subject; segmenting, by a muscle segmentation model, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and extracting, by a measurement extraction model 230, one or more measurements of one or more respective parameters of the paraspinal muscle of the subject based on the plurality of pixels included in the generated image segmentation mask of each of the one or more representative slices.

According to another aspect of the present disclosure, a computer-readable storage medium is provided. The computer-readable storage medium stores instructions that are configured, when executed by one or more processing devices of a system, to cause the system to perform operations. The operations include obtaining a plurality of magnetic resonance imaging (MRI) 2-dimensional image slices of a spine of a subject; identifying, by a slice selection model, one or more representative slices in the plurality of MRI slices, each of the one or more representative slices being located at or adjacent to a specified physiological region corresponding to a specific biomechanical environment in a respective spine level of the spine of the subject; segmenting, by a muscle segmentation model, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and extracting, by a measurement extraction model 230, one or more measurements of one or more respective parameters of the paraspinal muscle of the subject based on the plurality of pixels included in the generated image segmentation mask of each of the one or more representative slices.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

FIG. 8 is a block diagram of an example computer system, in accordance with some embodiments.

Figure 1:
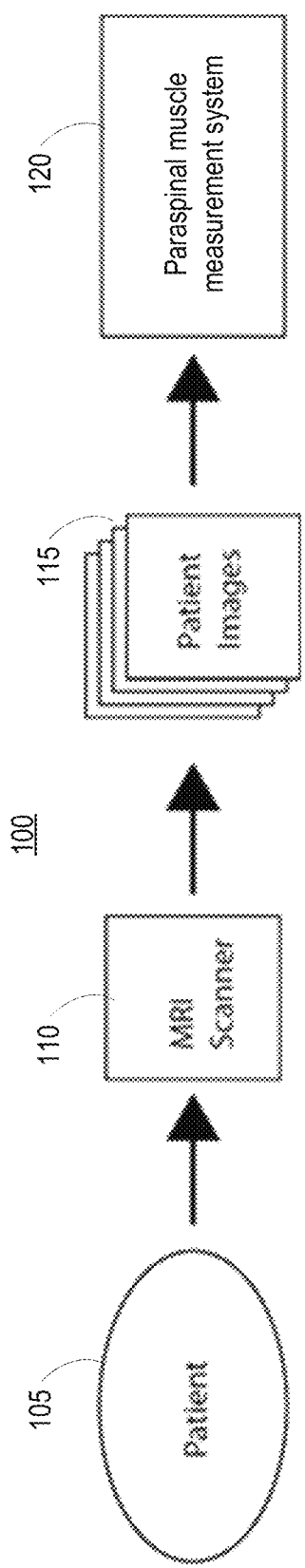
FIG. 1 is a workflow diagram illustrating a clinical setting in which a paraspinal muscle measurement system is used, in accordance with some embodiments.

It will be appreciated that, for simplicity and clarity of illustration, where considered appropriate, reference numerals may be repeated among the figures to indicate corresponding or analogous elements.

DETAILED DESCRIPTION

The present disclosure describes methods and systems for measuring paraspinal muscle parameters using magnetic resonance imaging (MRI). In addition, numerous specific details are set forth in order to provide a thorough understanding of the exemplary embodiments described herein. However, it will be understood by those of ordinary skill in the art that the exemplary embodiments described herein may be practiced without these specific details.

Motivation for and Benefits of Some Embodiments

The inventors have recognized and appreciated that accurate and reproducible measurement of paraspinal muscle parameters (e.g., cervical, thoracic, and/or lumbar paraspinal muscle parameters) depends on selecting imaging slices (e.g., MRI slices) at a standardized anatomic and biomechanical location in each region of the spine. Given anatomic variations and transitional anatomies, traditional methodologies of applying a numbering system to each spinal unit are known to be unreliable. As a result, significant inter-reader variability and error can exist when assessing paraspinal muscle.

The measurement methods described herein involve performing segmentation of the paraspinal muscle groups at a standard anatomic location within the spine. Using large patient databases and research, the inventors have identified and validated key biomechanical environments that serve as barometers for the assessment of paraspinal tissue integrity. For instance, the inventors' research demonstrates that both C3 and C7 are key biomechanical points for interpretation of the paraspinal muscle envelope in the cervical spine. These are key locations for determining head position and cervical spine quality of life and health. The inventors' research also demonstrates that the upper endplate of L4 (the second lowest motion segment) is a key biomechanical location for measuring lumbar paraspinal muscle parameters.

The accuracy of measurements of paraspinal muscle parameters is negatively impacted by the presence of metallic implants in the patient's body (e.g., in the spine). The inventors have developed a method for avoiding these negative impacts by reliably distinguishing between muscle and metal during the image segmentation process.

The inventors have developed methods to reliably define Paraspinal Muscle Quality (PMQ) based on ratios of different spine tissue types (e.g., fat and cerebrospinal fluid). The relationship of patterns of fat distribution, particle size (the Sobel index), and PMQ reflects disease states, degenerative spinal parameters, and patient demographics. The inventors' research has demonstrated that these parameters influence spinal integrity which can have significant ramification on patient health and quality of life.

Disclosed herein are systems and methods that reliably select a designated biomechanical location within a spine region, perform image segmentation of major paraspinal muscle groups, and accurately measure paraspinal muscle parameters such as functional cross section area, fatty infiltration, fat distribution, Sobel index, and PMQ. The present disclosure also describes systems and methods for reliably and accurately measuring paraspinal muscle parameters even in the setting of metallic spinal implants. Aspects of the methods and systems described herein are applicable not only to paraspinal muscle assessment, but more broadly to muscle and tumor assessment in other anatomic regions in native cases as well as in the setting of metallic implants. Some Embodiments of Improved Methods for Satellite Design Referring to FIG. 1, a clinical setting for assessing spinal health may include a magnetic resonance imaging (MRI) scanner 110 and a paraspinal muscle measurement system 120. In operation, a patient 105 enters the MRI scanner 110, which generates images 115 (e.g., two-dimensional image slices) of a region of the patient's body (e.g., the spine). Those images 115 are provided as input to the paraspinal muscle measurement system 120, which processes the images using techniques described below to obtain reliable and accurate measurements of paraspinal muscle parameters. As used herein, "paraspinal muscle" refers to both the paraspinal muscular tissue and any fat contained in the paraspinal muscular tissue, unless otherwise indicated.

The measurement system 120 can be applied to MRI slices representing full or partial spine MRI scan. For example, the measurement system 120 can be applied to MRI slices of one or more (e.g., all) the spine levels to measure paraspinal muscle parameters. In some embodiments, the measured paraspinal muscle parameters are relevant to characterizing degree of sarcopenia (e.g., systemic sarcopenia and/or sarcopenia in any paraspinal muscle of interest). Examples of relevant paraspinal muscle parameters that can be measured may include, without limitation, functional cross section area, fatty infiltration, and/or measures of fat distribution (e.g., marble ratio, Sobel index, etc.).

Figure 2:
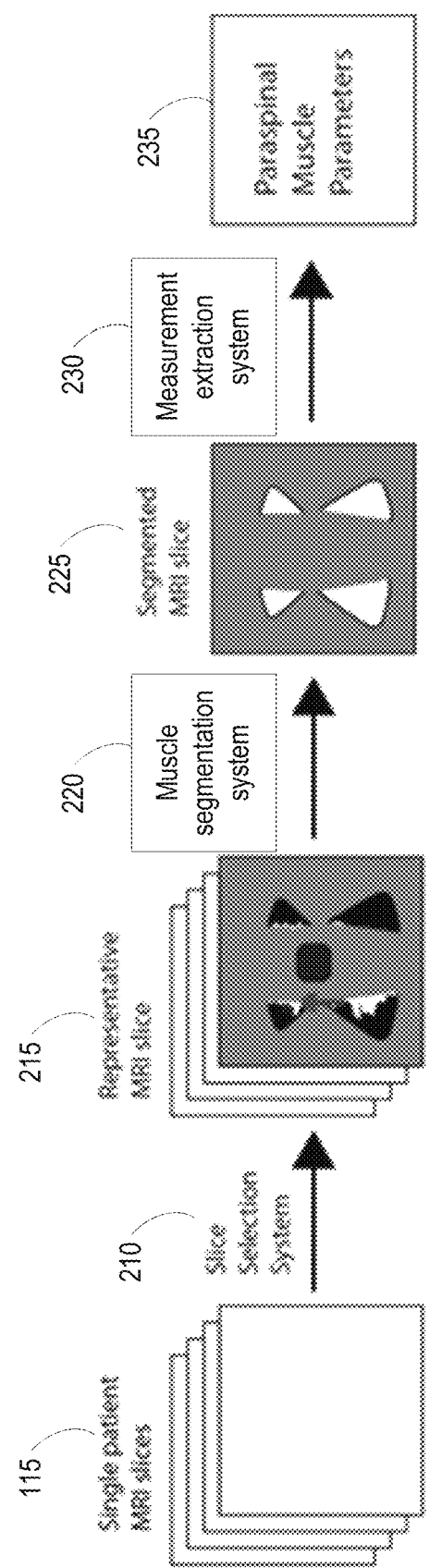
FIG. 2 is a block diagram of a paraspinal muscle measurement system, in accordance with some embodiments.

Referring to FIG. 2, the paraspinal muscle measurement system 120 may include a slice selection system 210 (described below with reference to FIGS. 3A and 3B), a muscle segmentation system 220 (described below with reference to FIGS. 4A and 4B), and a measurement extraction system 230 (described below with reference to FIGS. 5A and 5B). The MRI slices 115 of the patient's spine (e.g., full spine or one or more spine levels) are provided as inputs to the slice selection system 210, which selects an MRI slice 215 at a specific anatomic spine region corresponding to a specific biomechanical environment.

In some embodiments, the slice selection system 210 selects more than one MRI slice 215 (e.g., one slice at a specific anatomic spine region corresponding to a specific biomechanical environment in each of two or more spine levels; two or more slices at or adjacent to a specific anatomic spine region corresponding to a specific biomechanical environment in a spine level, etc.). Examples of these anatomical regions include (i) the upper endplate of the biomechanical environment corresponding to the L4 vertebral body (in the lumbar level), (ii) the upper endplate of the biomechanical environment corresponding to the C7 vertebral body (in the cervical level), and (iii) the upper endplate of the biomechanical environment corresponding to the C3 mid-vertebral body (in the cervical level). In the case of L4, the paraspinal muscles include psoas major, erector spinae, and multifidus. In some embodiments, the selected MRI slice 215 is an axial image orthogonal to the posterior cortex of the vertebral body of the specific anatomic spine region. For example, in the lumbar level, the selected MRI slice 215 may be an axial image orthogonal to the posterior cortex of the upper end plate of L4. The inventors have observed that the orthogonal orientation of the image is helpful for accurately measuring paraspinal muscle parameters expressed as absolute values (e.g., FCSA). For paraspinal muscle parameters expressed as proportions or ratios (e.g., fatty infiltration), MRI slices having orientations that deviate from the orthogonal orientation relative to the posterior cortex of the vertebral body (e.g., by up to 45 degrees) can yield sufficiently accurate measurements.

The muscle segmentation system 220 performs image segmentation of major paraspinal muscle groups in the selected MRI slice(s) 215, thereby producing a segmented MRI slice 225 corresponding to each of the selected MRI slices 215. In some embodiments, the muscle segmentation system 220 accurately performs muscle segmentation even in the setting of metallic spinal implants.

The measurement extraction system 230 processes the segmented MRI slice(s) to extract measurements 235 of paraspinal muscle parameters (e.g., functional cross section area, fatty infiltration, fat distribution, etc.). In some embodiments, extracted measurements are accurate even in the setting of metallic spinal implants.

Figure 3A:
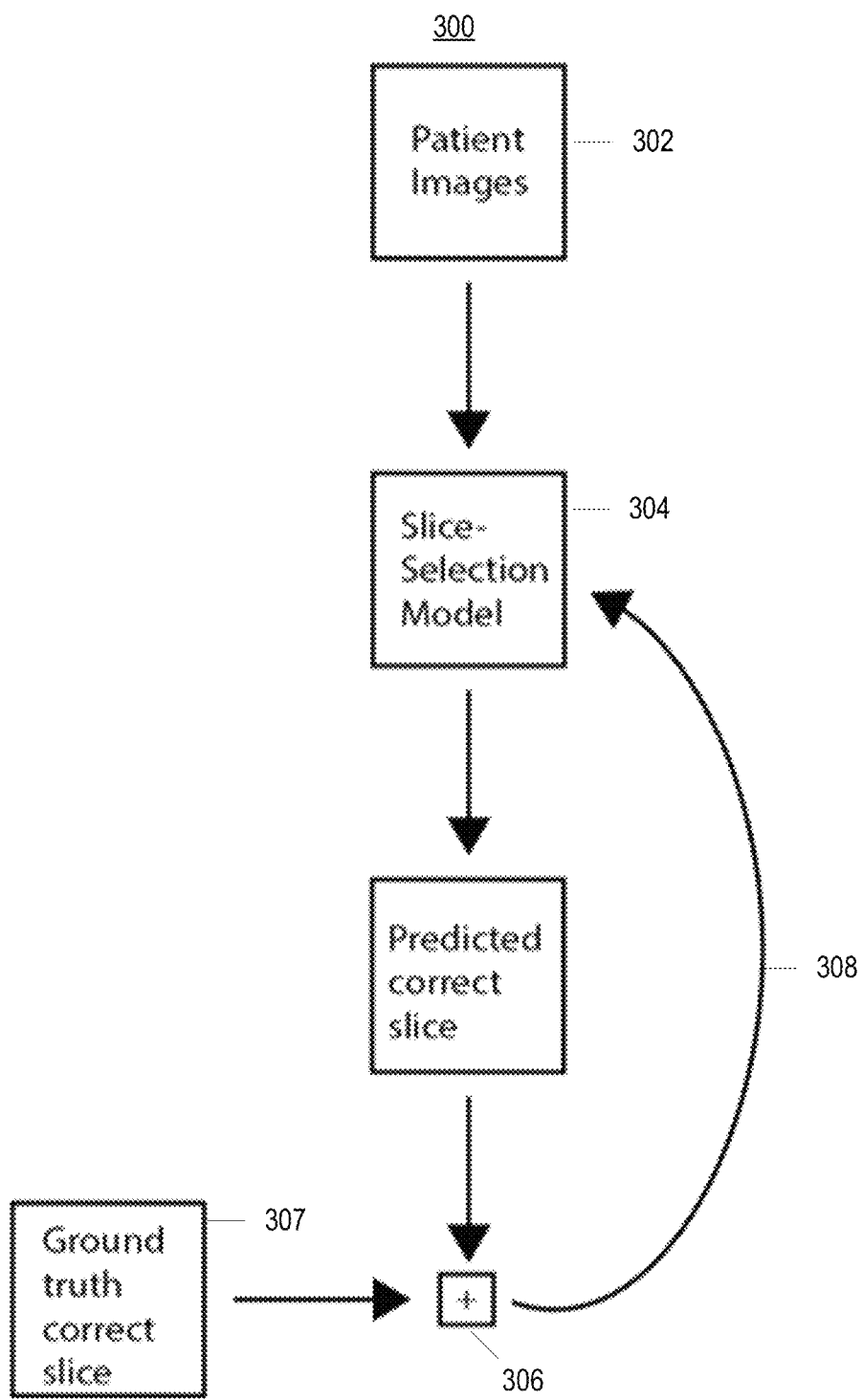
FIG. 3A is a flowchart of a method for training a machine learning model to identify an MRI slice corresponding to a specific anatomic region, in accordance with some embodiments.

Referring to FIG. 3A, a method 300 for training a machine learning model to identify a 2-dimensional axial MRI image slice ("MRI slice" or "slice") corresponding to a specific anatomic region may include steps 302-308. At step 302, a set of MRI slices 115 representing a 3-dimensional MRI scan of a patient's spine are obtained. Each of the slices may be 2-dimensional (e.g., height by width), with the third dimension being the number of slices (along the depth axis). The set of MRI slices may include slices of the patient's full spine, or slices of one or more spine levels.

At step 304, a machine learning model selects, from the set of slices, a candidate slice that is predicted to be a representative slice 215 at a specified physiological region (e.g., anatomic spine region) corresponding to a specific biomechanical environment. In some embodiments, the physiological region is selected based on its suitability for providing reliable and accurate measurements of paraspinal muscle parameters. For example, in the lumbar spine, a suitable (e.g., optimal) physiological location (e.g., anatomical location) for obtaining measurements of paraspinal muscle parameters corresponds to the upper endplate of the L4 vertebral body. In the cervical spine, a suitable (e.g., optimal) physiological location for obtaining measurements of paraspinal muscle parameters corresponds to the upper endplate of the biomechanical environment corresponding to the C7 vertebral body and the C3 mid-vertebral body. In the thoracic spine, a suitable (e.g., optimal) physiological location for obtaining measurements of paraspinal muscle parameters corresponds to the mid apical segment which is a unique biomechanical environment that can occur at different anatomic locations (e.g., the T5-T8 vertebrae) based on an individual's unique thoracic spinal anatomy (e.g., the individual's thoracic kyphosis). In some embodiments, the optimal physiological location for obtaining measurements of paraspinal muscle parameters in the thoracic spine corresponds to the point of maximum kyphosis, which is generally between T5 and T8.

In some embodiments, the set of slices provided as input to the model includes slices from two or more spine levels, and the model simultaneously selects a candidate slice from each of the two or more spine levels. In some embodiments, the set of slices includes slices from two or more spine levels, but the model selects a candidate slice from a single spine level. In some embodiments, the set of slices includes slices from a single spine level, and the model selects a candidate slice from that spine level. In the latter case, additional batches of slices from the patient's other spine levels may be provided as inputs to the model, and the model may select candidate slices from those batches for the corresponding spine levels.

The inventors have observed that a candidate slice two slices above an optimal physiological location, one slice above the optimal physiological location, one slice below the optimal physiological location, or two slices below the optimal physiological location may be suitable for reliably and accurately measuring parameters of the paraspinal muscles, because the paraspinal muscle parameters tend to be sufficiently similar throughout the region represented by the margin of plus-or-minus two slices from the optimal physiological location.

The model selects the candidate slice based on features learned from representative slices and contextual information derived from other, non-representative slices included in the set of slices with which the model has been trained. In some embodiments, the model includes a first stage that converts each slice to an encoded representation. Initially, the model's first stage converts each 2-dimensional slice to an encoded representation. The encoded representations may help the model learn and identify patterns, textures, and/or spatial relationships within the slices.

In some embodiments, the first stage includes a convolutional neural network (CNN), a transformer, and/or an encoder-decoder architecture (e.g., an auto-encoder). The CNN may include two or more levels, wherein the first level transforms pixels into a representation using learned convolutional weights, the next level transforms the previous representation into a new transformation, and so forth. The model's first stage may also perform one or more preprocessing tasks (e.g., sequence padding, data augmentation, etc.). The data augmentation operations may increase the generality of the training set, thereby enhancing the model's ability to generalize. Examples of image data augmentation tasks may include slice-dropping, stochastically modifying start and end points, image rotation, affine transformation, translation, image flipping, altering contrast, altering brightness, altering gamma, clipping high and/or low pixel values, elastic deformation, regional blurring, zooming, cropping, stretching, altering image sharpness, and introducing noise. The slice encodings generated by the model's first stage represent a series with consistent inter-slice spatial relationships.

The series of slice encodings is then provided as input to the second stage of the model. In some embodiments, the model's second stage includes an iterative recurrent neural network (iterative RNN) that uses spatial context from the order of the slice encodings to determine the probability of each individual slice encoding being located at the specified physiological location. The second stage of the model selects the slice corresponding to the encoding with the highest probability of being located at the specified physiological location as the candidate slice.

In some embodiments, the model's second stage may use a transformer or other suitable type of model, rather than an iterative RNN, to select the candidate slice. In some embodiments, the model's second stage may use additional features (e.g., encodings) to select the candidate slice. Such features may include contextual features (e.g., features indicating contextual information such as the patient's height, weight, sex, age, health status, etc.) that can potentially affect the location or appearance of the physiological location of interest.

An example has been described in which the slice selection model has a two-stage architecture, wherein the first stage generates encodings and the second stage selects a candidate slice based on the encodings. In some embodiments, the process of obtaining slice encodings and using a transformer structure to select a candidate slice may be combined in an architecture such as a Vision/Visual Transformer (ViT), which includes feature extraction for the encodings, linear embedding, transformer layers, and classification heads.

An alternative technique for medical slice selection is to quantify the probability that a slice is the target slice (e.g., the slice at or nearest to a specified physiological location) by applying a one-to-one slice-to-probability model for each slice in a 3-dimensional image and choosing the slice with the highest probability as the candidate slice. The slice selection method 300 improves upon this alternative technique by using a clinically informed many-to-one slices-to-probability approach, wherein the assessment of each individual slice is based not only on the individual slice, but also on the other slices. In this approach, two or more of the slices (e.g., all the slices) are used to predict which single one is the target slice. With the many-to-one slices-to-probability approach, the candidate slice may be chosen by comparing many slices in series and using the context from multiple (e.g., all) slices in the 3-dimensional image to choose the candidate slice.

At step 306, the candidate slice is compared to the actual representative slice 307 ("ground truth correct slice"). In some embodiments, comparing the candidate slice to the ground truth correct slice involves determining the number of slices between the candidate slice and the ground truth correct slice in the sequence of slices.

At step 308, based on the comparison of the candidate slice and the actual representative slice 307, parameters of the model may be adjusted. In some embodiments, cross-entropy loss and backpropagation with stochastic optimization are used to adjust the internal weights of the model's neural networks during training. In some embodiments, the loss is scaled to be proportional to the difference between the selected candidate slice and the actual representative slice ("ground truth" slice). This difference may be calculated as the number of slices from the actual representative slice to the selected candidate slice, and may be signed or unsigned.

The many-to-one slices-to-probability approach of the slice selection model can be used to carry out tasks other than the selection of an MRI slice nearest to a specified physiological location. For example, some embodiments of the slice selection model may be configured to select one or more slices corresponding to specific biomechanical environments determined through imaging features (e.g., by a medical expert). Some embodiments of the slice selection model may be configured to select one or more slices corresponding to anatomic correlation of pathology findings as determined by a medical expert, though not necessarily corresponding to imaging features. Such pathologies may include, but are not limited to, primary tumor, metastases, bone fracture, connective tissue changes, fibrous changes (e.g., cirrhosis), and fluid collections (e.g., cysts, hematomas, pleural effusions, pericardial effusions, ascites). Some embodiments of the slice selection model may be configured to select one or more slices corresponding to anatomical locations suitable for downstream tasks such as segmentation, measuring size, and locating pathology. One example of such a downstream task is using the MRI slice corresponding to the upper end plate of the biomechanical environment that represents the L4 vertebral body to characterize the degree of sarcopenia. Other examples of anatomical locations include C3 for cranial nerve parameters and C7 for balance measures.

Examples have been described in which the slice selection model has a two-stage architecture or a ViT architecture. In some embodiments, the slice selection model has a Siamese neural network architecture. In such embodiments, the slices in a 3-dimensional medical image (e.g., MRI image) are provided as input to a Siamese neural network, which calculates the probability that each slice is the target slice (e.g., the slice at or nearest to a specified physiological location) and selects the slice with the highest probability as the target slice. The model calculates the probability that each candidate slice C is the target slice based on the similarity between the candidate slice C and one or more actual representative slices ("ground truth" slices) at or near the specified physiological location. Thus, with the Siamese neural network model, the candidate slice is selected by comparing each slice to the actual representative slice(s) and using the context from multiple (e.g., all) slices in the 3-dimensional image to select the candidate slice that has the highest probability of being the target slice.

In some embodiments, the Siamese neural network model is underpinned by twin convolutional neural networks (CNNs), sharing identical or highly similar parameters, operating synchronously to process distinct image inputs in a parallel manner. These CNNs may be structured to analyze and extract hierarchically complex features from input images through a series of convolutional layers, pooling layers, and fully connected layers, culminating in a feature vector representation of the analyzed images. During the training phase, each pair of images—one being a representative image of the target, ground truth, spine level and the other being non-representative—is propagated through the network to compute feature vectors for each image. A loss function (e.g., contrastive loss) is then used to compute the dissimilarity between the derived feature vectors, incentivizing the network to minimize the distance between similar spine level instances while maximizing the distance between different spine level instances. Consequently, through iterative training cycles, the network hones its ability to discern and categorize the specific spine level shown in a given MRI slice with heightened accuracy.

Other embodiments include alternative loss functions such as cross-entropy loss and triplet loss. The cross-entropy loss function serves to minimize the divergence between the true and predicted spine level classifications, whereas the triplet loss function operates by not only distinguishing between a positive and a negative example but also ensuring that the positive examples are closer to the anchor slice than the negative examples by a margin.

In some embodiments, the slice selection module is configured to select one or more slices corresponding to pathology in a localized anatomic location as determined by a medical professional. Such pathologies may include, without limitation, tumors, masses, bone fractures, connective tissue changes, and fluid collections. In some embodiments, the slice selection module is configured to select one or more slices corresponding to quantitative imaging biomarkers (QIBs) related to spine-adjacent structures (e.g., aortic calcification, carotid stenosis, etc.). Such QIBs may be identified based on analysis of spinal MRI and medical images obtained using imaging modalities classically suitable for calcium interpretation (e.g., CT angiography, CT, x-ray, etc.) for subjects having such spine-adjacent structures.

Figure 3B:
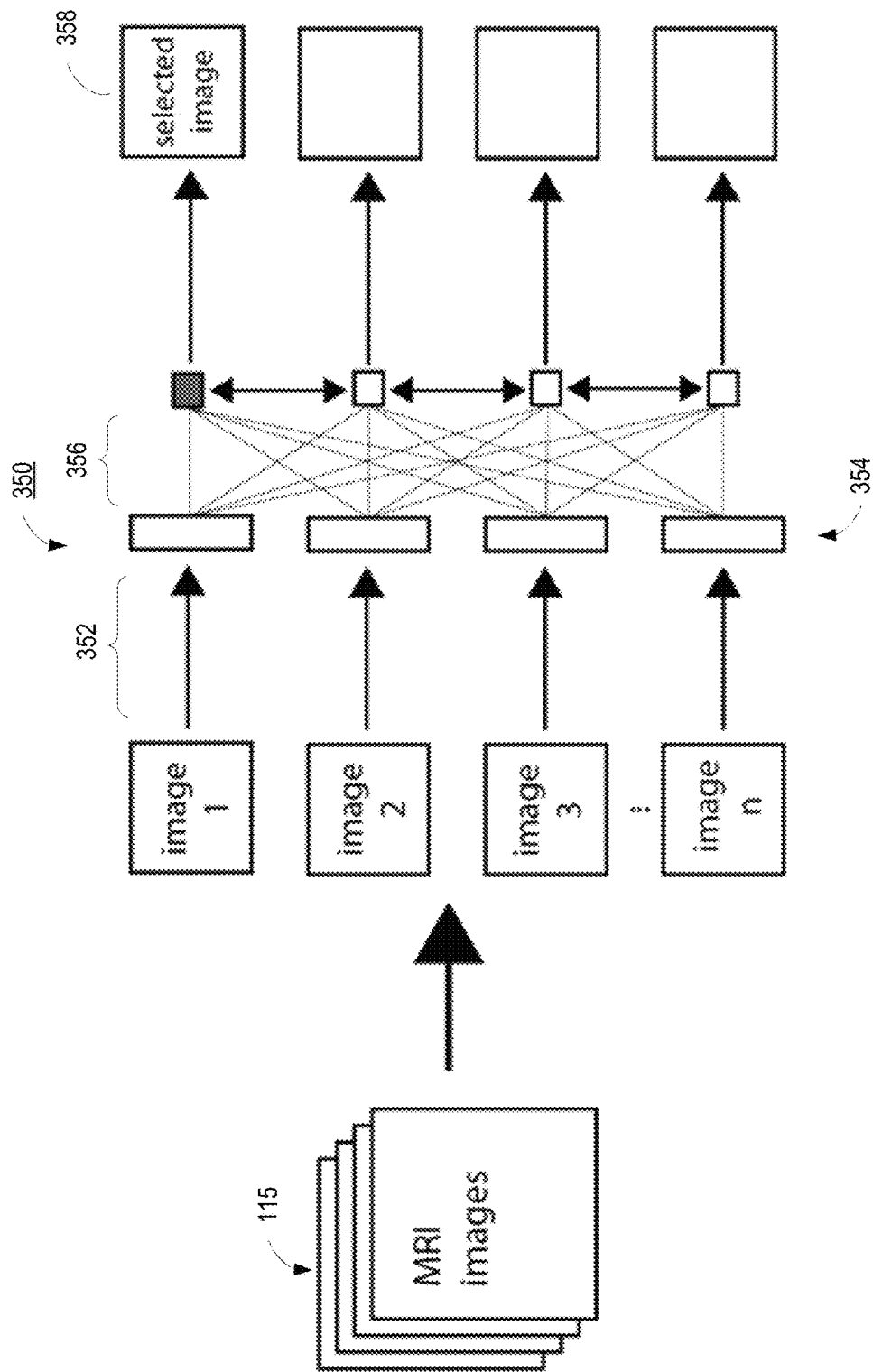
FIG. 3B is a block diagram of neural network model for slice selection, in accordance with some embodiments.

Referring to FIG. 3B, an example of a trained slice selection model 350 is shown. As described above, the slice selection model 350 may include a first stage 352 and a second stage 356. The first stage 352 may include a convolutional neural network (CNN) that generates encodings 354 for a set of MRI slices 115 of a patient's spine. The second stage 356 may include a recurrent neural network (RNN) 356 configured to select a candidate slice 358 that has the highest probability of being the target slice based on the encodings of all the slices in the input set. The target slice may be a slice at or near (e.g., within +2 slices) a target physiological location in the body corresponding to a specific biomechanical environment. In some embodiments, the trained selection model 350 is a convolutional recurrent neural network (CRNN).

In some embodiments, the CNN in the first stage 352 of the slice selection model 350 is a 2-dimensional CNN configured to encode MRI slices. Performance of the CNN may be enhanced by using group-norm (or batch-norm), dropout, a non-linear activation function, and skip (or residual) connections.

In some embodiments, the CNN and/or the RNN may be initialized with pretrained model weights during the training process. The CNN pretrained weights may be provided by a model including but not limited to VGG, Inception, ResNet, MobileNet, or EfficientNet. The CNN pretrained weights may be generated using pretraining steps or provided by a Siamese neural network or contrastive learning process.

In some embodiments, the RNN may have an iterative network architecture. For example, the recurrent weights may use GRU architecture or LSTM architecture. In some cases, the iterative network architecture is based on a transformer network. In some cases, the iterative network is multi-layered and bidirectional. In some embodiments, the final output series of the RNN is passed through a SoftMax activation function (or Sigmoid activation for binary classes) and binary cross entropy loss is applied to each individual output, with the loss minimized using backpropagation and ADAM optimization with gradient clipping.

In some embodiments, a trained slice selection model exhibits accuracy greater than 85%, between 85% and 90%, greater than 90%, between 90% and 95%, or greater than 95% when selecting a slice at or near (e.g., within +2 slices) a target physiological location.

Figure 4A:
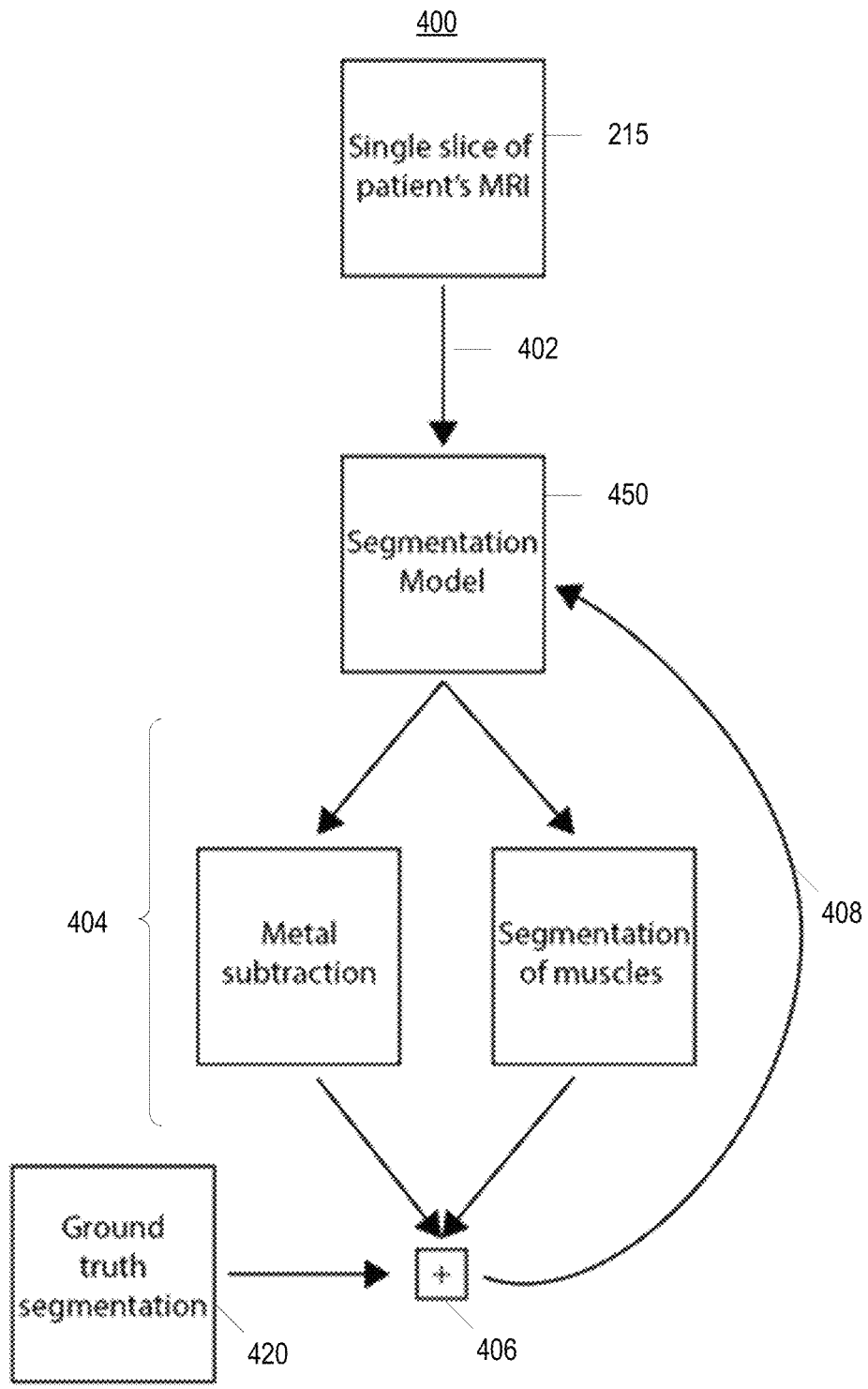
FIG. 4A is a flowchart of a method for training a machine learning model to perform muscle segmentation in an MRI slice with metal subtraction, in accordance with some embodiments.

Referring to FIG. 4A, a method 400 for training a machine learning model to perform muscle segmentation in an MRI slice with metal subtraction is shown. The trained model may be configured to segment and isolate the paraspinal muscles in a representative MRI slice 215 (e.g., the slice selected by the slice-selector model 350). In this context, "metal subtraction" refers to the process of segmenting around the metal in the MRI slice, so the metal isn't included in the portions of the slice that are subsequently analyzed to measure the muscle parameters. This technique may be beneficially applied to spinal MRI images of subjects having any suitable metallic implants, e.g., titanium pedicle screws, interbody cages, spinal cord stimulators, etc.

The training method 400 may include steps 402-408.

At step 402, a representative MRI slice 215 for a level of a subject's spine is obtained.

At step 404, a machine learning model 450 (referred to herein as a "segmentation model") performs metal subtraction and muscle segmentation on the representative MRI slice 215. In some embodiments, the segmentation model 450 is a U-net based CNN model. In some embodiments, the U-net based CNN model includes modifications with transformers and different degrees of connectivity between levels. In some embodiments, the U-net based CNN model uses group-norm, skip connections, and attention layers. In some embodiments, the U-net based CNN model operates similar to a V-net and replaces the up-sampling and down-sampling pooling layers with a convolutional layer. In some embodiments, the U-net based CNN model includes nested and skip pathways to connect the encoder and decoder through a series of nested dense convolutional blocks. In some embodiments, the U-net based CNN model incorporates recurrent convolutional layers. In some embodiments, the U-net based CNN model is augmented with attention gates, which guide the model to focus on more relevant regions and for feature selectivity. In embodiments involving transformers, the transformers may include but are not limited to vision transformers and/or shifted window (swin) transformers. In some embodiments, the U-net based CNN model includes full-scale skip connections and a classification-guided module.

The model's metal subtraction functionality removes image artifacts associated with metal implants (e.g., plates, rods, and screws from spine fusion procedures), so that pixels corresponding to or distorted by metal are not analyzed during the subsequent determination of paraspinal muscle parameters. For many subjects who have metal implants, performing metal subtraction is critically important to obtain accurate measurements of paraspinal parameters, because extracting accurate measurements of muscle parameters from images that have metal distortions is quite difficult. Although a machine learning model can be trained to extract accurate muscle measurements from slices with metal distortions, such training is predicated on the availability of a training dataset that includes a suitable number of MRI slices with metal artifacts. The inventors have observed that such datasets are generally small and poorly labeled, making it difficult to train a model to extract accurate muscle measurements from slices with metal distortions using available training data.

In contrast, training the segmentation model 450 to perform metal subtraction is more practical, because suitable training datasets are more readily available. The inventors have observed that a segmentation model 450 can be trained to reliably and accurately perform metal subtraction on MRI slices using synthetic training data (e.g., MRI images that have been artificially altered to simulate the presence of metal artifacts) and/or metal training data (e.g., MRI images in which metal artifacts are present).

The traditional method of processing medical images with artifacts created by medical devices involves separately training a model specifically on a data set of patients with a consistent medical device artifact. The present disclosure presents two approaches that increase efficiency and accuracy of the traditional method by allowing incorporation of data from patients without medical devices. The first approach is to utilize digital artifact modification, whereby images from non-device patients are modified with the addition of a device in an anatomic location consistent with its medical placement, and the corresponding ground truth segmentation mask is modified to no longer include the boundaries set by the digital artifact. The appearance and location of the digital artifact can be determined by medical experts who have experience in placing such devices or by utilizing deep learning techniques such as Generative Adversarial Networks (GANs).

The second approach utilizes transfer learning. In this approach, the dataset is divided into device and non-device patients. Each dataset is manually segmented by a medical expert, and the device dataset is segmented so as to not include the device. Because medical datasets typically contain more images of patients without devices, the non-device dataset is used to train an accurate segmentation model consistent with the training method in FIG. 4A. The parameters of this initial model are then used as the initial parameters for a second iteration of training using only the device-dataset. This iteration of training is consistent with the training method of FIG. 4A, and can be enhanced by using frozen weights, lower learning rate, and image augmentations.

Returning to step 404 of the segmentation method 400, the model's muscle segmentation functionality involves isolating and identifying (e.g., highlighting) the paraspinal muscles area including the fat. Having performed metal subtraction and muscle segmentation, the segmentation model 450 outputs a segmentation map identifying (e.g., highlighting) the paraspinal muscles.

At step 406, the segmentation map generated by the model is compared to a ground truth segmentation map 420. The ground truth segmentation map 420 may be created manually via pixelation and tissue-specific intensity threshold levels for muscle, fat, and fascia.

At step 408, based on the comparison of the model's segmentation map and the ground truth segmentation map 420, parameters of the segmentation model 450 may be adjusted. In some embodiments, a combined DICE and binary cross entropy loss function is used to adjust the internal parameter values (e.g., neural network weights) of the segmentation model during training. Other possible loss functions include individual DICE loss, individual BCE loss, boundary loss, Tversky loss, IoU/Jaccard loss, weighted loss functions, etc. The model weights are then updated accordingly through backpropagation with stochastic optimization.

Figure 4B:
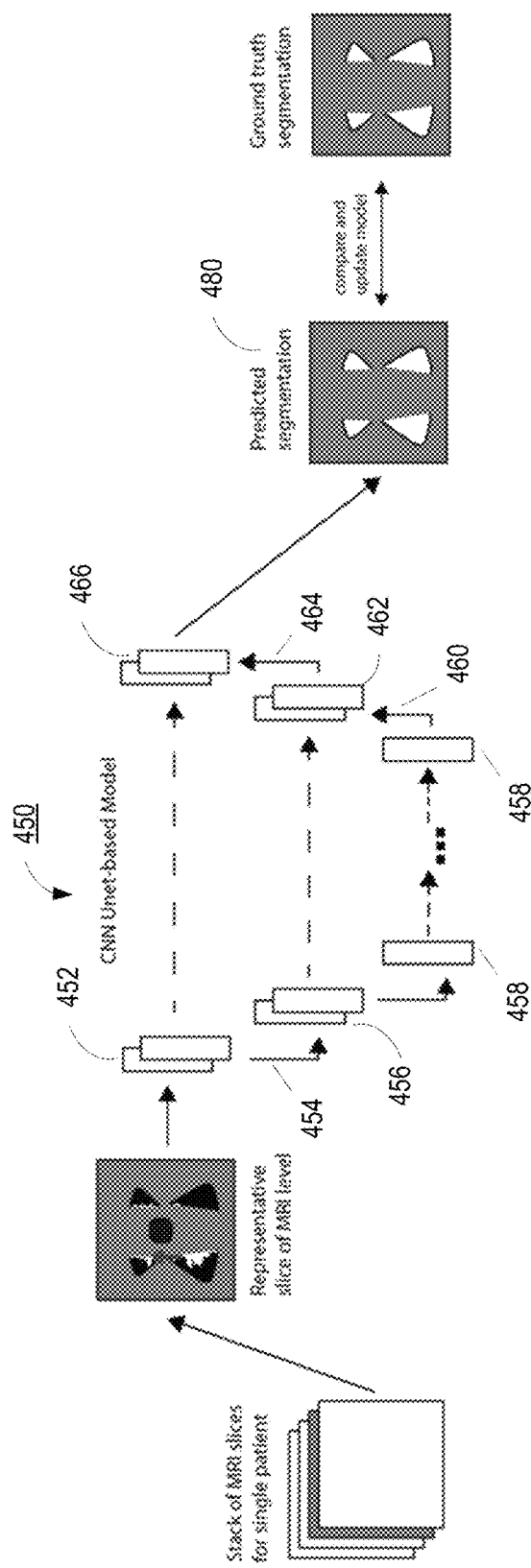
FIG. 4B is a block diagram of a machine learning model for muscle segmentation with metal subtraction, in accordance with some embodiments.

Referring to FIG. 4B, an example of a segmentation model 450 is shown. In the example of FIG. 4B, the segmentation model 450 is a U-net based CNN model having multiple convolutional layers 452 followed by downsampling with a pooling layer 454 followed by another set of convolutional layers 456 and so on. Each series of convolutional layers learns more abstract features of the paraspinal muscles in the MRI slices. In some embodiments, downsampling may consist of learned convolutional weights, average pooling, or max pooling. Once this downsampling is completed, these latent representations 458 are upsampled 460 to create segmentation maps 480 of the paraspinal muscles. This upsampling is performed with several convolutional layers 462 followed by an upsampling layer 464 followed by another set of convolutional layers 466 and so on. The output of the final upsampling layer is a map of probabilities that each pixel of the image is part of a specific paraspinal muscle, and the model selects the highest probability class for each pixel. The class assigned to a pixel may indicate whether the pixel is part of a muscle or not, and if the pixel is part of a muscle, the assigned class may indicate the muscle's type.

Using the training method 400 of FIG. 4A, the segmentation model 450 may be trained to accurately perform a variety of tasks, including but not limited to automatic segmentation of subcutaneous fat/adipose tissue, visceral fat/adipose tissue, whole body adipose tissue, skeletal muscle, smooth muscle, cardiac muscle, and/or bone.

In some embodiments, data augmentation may be performed on the training data (e.g., representative slices) prior to training the segmentation model 450. The data augmentation operations may increase the generality of the training set, thereby enhance the segmentation model's ability to generalize. Examples of image data augmentation tasks may include slice-dropping, stochastically modifying start and end points, image rotation, affine transformation, translation, image flipping, altering contrast, altering brightness, altering gamma, clipping high and/or low pixel values, elastic deformation, regional blurring, zooming, cropping, stretching, altering image sharpness, and introducing noise.

In some embodiments, the segmentation model 450 may include an encoder that encodes the representative image slice. The encoder may be, for example, a 2-dimensional convolutional neural network (CNN). The CNN's performance may be enhanced by group-norm (or batch-norm), dropout, non-linear activation function, and skip (or residual) connections.

In some embodiments, the second round of learning during the transfer learning process benefits from using weight freezing and a lower learning rate.

In some embodiments, the loss function for training the segmentation model is DICE loss combined with binary cross entropy. Other potential loss functions for semantic segmentation include individual DICE loss, individual BCE loss, boundary loss, Tversky loss, IoU/Jaccard loss, weighted loss functions, etc. In some embodiments, the loss is minimized using backpropagation and ADAM optimization with gradient clipping.

The inventors have collected experimental data indicating that some embodiments of the muscle segmentation model 450 reduce the error in measurements of various paraspinal muscle parameters by amounts between 3% and 14% for subjects whose spinal MRI slices exhibit metal artifacts.

Figure 5A:
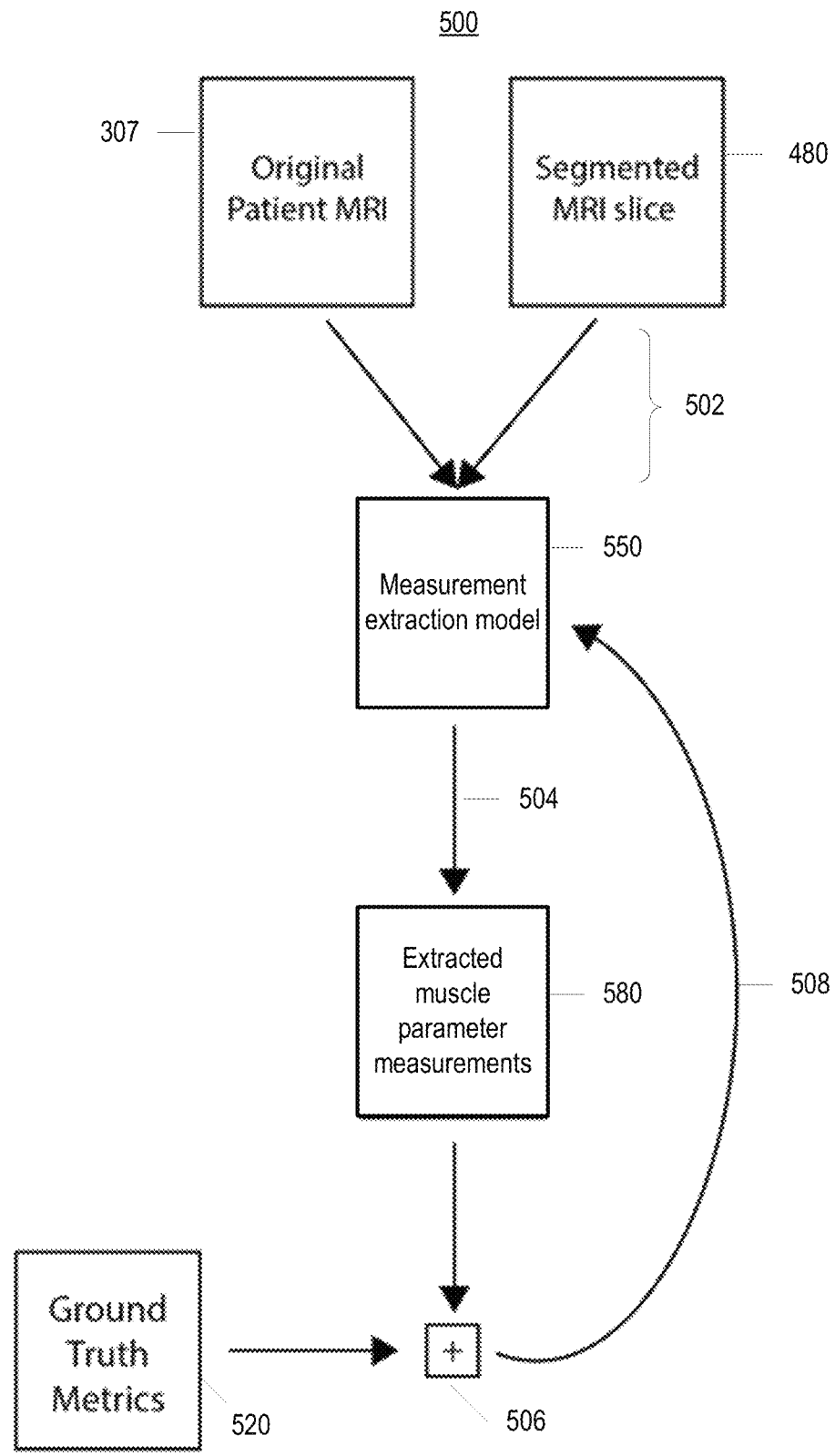
FIG. 5A is a flowchart of a method for training a machine learning model to extract paraspinal muscle parameter measurements from a segmented MRI slice, in accordance with some embodiments.

Referring to FIG. 5A, a method 500 for training a machine learning model to extract paraspinal muscle parameter measurements from a segmented MRI slice of a subject is shown.

The trained model may be configured to output measurements of paraspinal muscle parameters (e.g., functional cross section area, fatty infiltration, fat distribution, etc.). In some embodiments, the trained model is configured to output a characterization of sarcopenia in the subject.

The training method 500 may include steps 502-508.

At step 502, a segmented, representative MRI slice 480 for a level of a subject's spine and the actual representative slice 307 ("ground truth correct slice") from the subject's original set of MRI slices 115 are obtained. The segmented, representative MRI slice 480 includes a segmentation mask.

At step 504, a machine learning model 550 (referred to herein as a "measurement extraction model") extracts measurements of paraspinal muscle parameters (e.g., functional cross section area, fatty infiltration, fat distribution, etc.) from the segmented, representative MRI slice 480.

To extract these measurements, the measurement extraction model 550 applies the segmentation mask generated by the segmentation model 450 to the representative MRI slice 307, such that all pixels within the segmentation mask are included (e.g., retained with unchanged values) and all pixels outside the segmentation mask are excluded (e.g., screened out, marked as non-contributory, etc.). This step yields an overlaid masked image, which is then passed through a first model stage (e.g., a multi-layer convolutional neural network with learned weights and kernels), which converts the overlaid masked image into a representation within a latent feature space. This abstract intermediate representation is then rearranged into a linear vector, which is used as input for second model stage (e.g., a deep neural network (DNN) with learned weights). This DNN may include an input layer, one or more hidden linear layers, and one or more (e.g., three) output layers. In some embodiments, this DNN benefits from the addition of dropout, ReLU activation, and batch-norm. The second model stage may extract the measurements 580 of paraspinal muscle parameters (e.g., functional cross-section area, fatty infiltration, and fat distribution) from the encoding generated by the first model stage.

In some embodiments, the measurement extraction model 550 may use a bias field correction algorithm, such as N4 or MICO, to remove low-frequency intensity variations or incorrect intensity gradients in MRI images.

An example has been described in which a measurement extraction model 550 is used to extract measurements of paraspinal muscle parameters from a segmented, representative MRI slice 480. Other techniques for extracting measurements of paraspinal muscle parameters may be used. In some embodiments, extracting measurements of specific paraspinal muscle parameters, such as fatty infiltration, involves "thresholding" (within a segment of the MRI slice 480 designated as paraspinal muscle by the image segmentation mask, classifying pixels as "muscle" or "fat" based on the pixel values) and then dividing the number of pixels in the segment classified as fat by the total number of pixels (which is the sum of the fat pixels and the muscle pixels). This numerical method may be applied to other parameters as well.

More formally, "thresholding" is the process of transforming a grayscale image (or a portion thereof) into a binary image. Thresholding involves establishing a threshold value that assists in the conversion of grayscale images into binary images, and classifying pixel intensities either above or below this value into separate categories (e.g., paraspinal muscle and fat). These thresholding methods include, but are not limited to Otsu's method, Isodata (intermeans) algorithm, mean of firsts, mean of firsts plus standard deviation, adaptive thresholding, Li, Triangle, Yen, mean, minimum, Niblack and Sauvola.

Fat distribution can also be characterized by the extent to which fat belongs to a continuous large segment of fat or a non-continuous small segment of fat. In some embodiments, this characterization can be determined by techniques including, without limitation, erosion with dilation, morphological closing, depth first search, breadth first search, skeletonization, or granulometry. In some embodiments, this characterization can be determined by unsupervised learning methods including, but not limited to, conditional random fields, clustering, local binary pattern, Gabor filters, or fractal analysis.

In some embodiments, a deep learning system configured to use thresholding techniques (e.g., the above-described thresholding techniques) may be used to autonomously extract measurements of the paraspinal muscle parameters from representative MRI slices 480. In some embodiments, these measurements are used for clinical purposes. Alternatively, such measurements and the corresponding MRI slices can be used to train the measurement extraction model 550. When used to train the measurement extraction model 550, the deep learning system may iteratively use a data generation module and a model training module to iteratively train the measurement extraction model 550 on batches of data.

At step 506, the muscle parameter measurements extracted by the measurement extraction model 550 are compared to ground truth measurements 520. The ground truth measurements 520 may be obtained using conventional techniques (e.g., expert or computer-based analysis of manually-segmented MRI images, etc.).

At step 508, based on the comparison of the model's extracted measurements 580 and the ground truth measurements 520, parameters of the measurement extraction model 550 may be adjusted. The training process involves updating the model parameters to minimize a loss function that represents the difference between the extracted measurements 580 and the ground-truth values 520. In some embodiments, the loss function(s) used to adjust the model's internal parameter values may include, without limitation, cross entropy, mean squared error, mean absolute error, log likelihood, hinge loss, Huber loss, etc. The model weights are then updated accordingly through backpropagation with stochastic optimization.

Figure 5B:
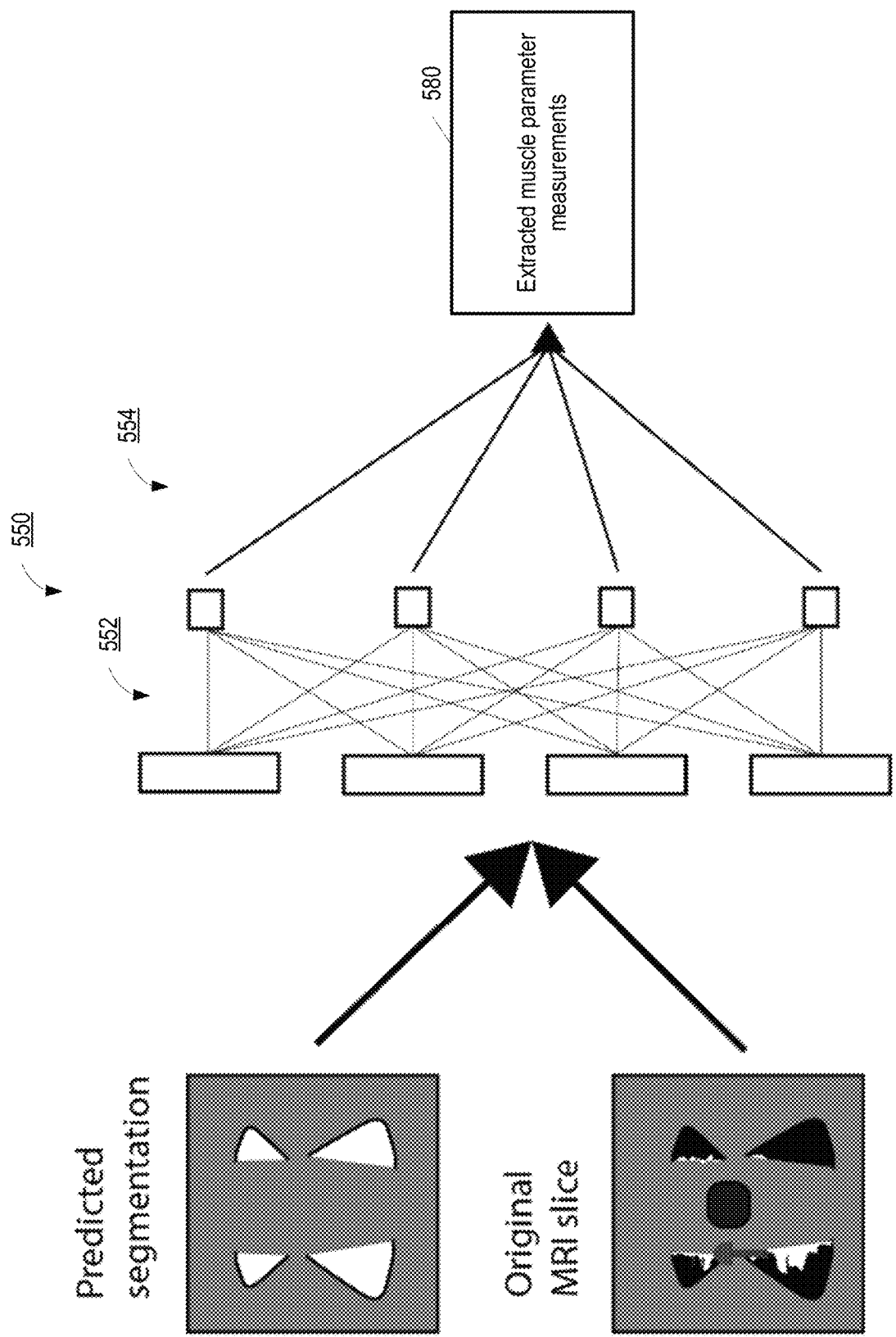
FIG. 5B is a block diagram of a machine learning model used to extract measurements of paraspinal muscle parameters from an MRI slice, in accordance with some embodiments.

Referring to FIG. 5B, an example of a measurement extraction model 550 is shown. In the example of FIG. 5B, the measurement extraction model 550 includes a first stage 552 and a second stage 554. In some embodiments, the first stage 552 includes a multi-layer convolutional neural network CNN with learned weights and kernels, which converts an overlaid masked image into a representation within a latent feature space. The CNN then rearranges this abstract intermediate representation into a linear vector, which is provided as input to the second stage 554. In some embodiments, the second stage 554 includes a deep neural network (DNN) with learned weights. This DNN may include an input layer, one or more hidden linear layers, and one or more (e.g., three) output layers. The second model stage 554 may extract the measurements 580 of paraspinal muscle parameters.

Using the training method 500 of FIG. 5A, the measurement extraction model 550 may be trained to accurately perform a variety of tasks, including but not limited to (1) detecting and assessing sarcopenia associated with spinal degenerative changes (e.g. spinal stenosis, facet degeneration, instability, deformity, etc.) versus systemic wasting disorders (e.g. cachexia); and (2) assessing paraspinal muscle quality. (The inventors have developed novel muscle tissue quality assessment tools that rely on ratios of soft tissue types to spinal fluid and fat to derive such parameters as Paraspinal Muscle Quality (PMQ), which is an assessment of the health of lean myocytes themselves.) Some embodiments of the muscle measurement extraction model 550 may also be used to enhance the prediction of cardiometabolic health markers or prediction of mortality from the segmented pathologies described previously.

Figure 6:
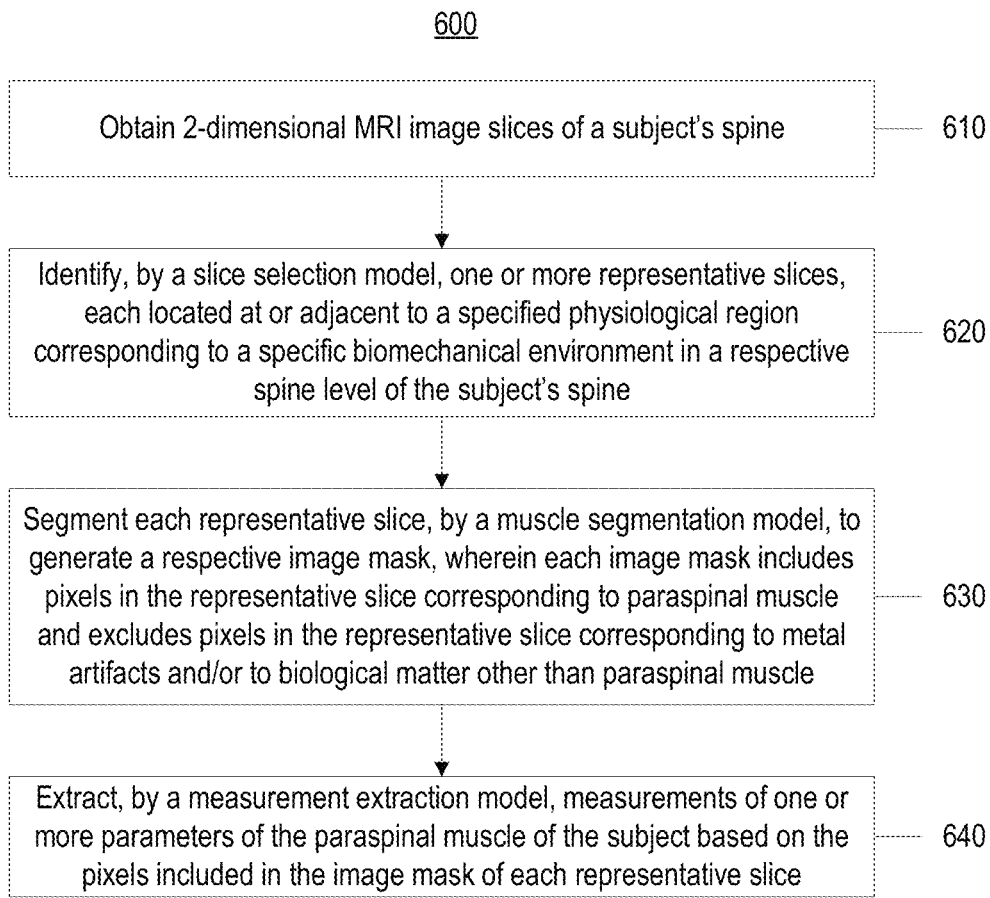
FIG. 6 is a flowchart of a method for measuring paraspinal muscle parameters, according to some embodiments.

Referring to FIG. 6, a method 600 for measuring paraspinal muscle parameters is shown, according to some embodiments. The method 600 may include steps 610-640.

At step 610, magnetic resonance imaging (MRI) 2-dimensional image slices 115 of a subject's spine may be obtained. The MRI image slices 115 may be obtained using any suitable technique, for example, by using an MRI scanner to scan the subject's spine and generate the MRI image slices, or by loading the stored MRI image slices from a local or remote computer-readable storage device.

At step 620, a slice selection model may identify one or more representative slices 215 in the MRI slices 115. Each of the representative slices may be located at or adjacent to a specified physiological region corresponding to a specific biomechanical environment in a respective spine level of the spine of the subject.

To identify the representative slices 215, any suitable slice selection model may be used, including but not limited to embodiments of the above-described slice selection model 215. In some embodiments, a first stage of the slice selection model generates encodings for each of the MRI image slices 115. In some embodiments, the MRI image slices 115 include one or more sets of MRI image slices corresponding to one or more respective spine levels of the subject's spine. In some embodiments, from each of the sets of MRI image slices, a second stage of the slice detection model selects a representative slice located at or adjacent to a specified physiological region corresponding to a specific biomechanical environment in the respective spine level. The selection of a representative slice for a given spine level may be based on the encodings of all the image slices in the set corresponding to that spine level, or based on the encodings of all MRI image slices 115. The reliance on encodings of multiple image slices to identify a representative MRI image slice may be referred to herein as a "many-to-one slices-to-probability approach." Optionally, the selection of a representative slice for a given spine level further may be based on an ordering of the image slices in the plurality of image slices, as the ordering of the image slices conveys information about each slice's location relative to the other slices (and relative to the subject's spine).

In some embodiments, the one or more representative slices include a representative slice located at or adjacent to an upper endplate of a biomechanical environment corresponding to a C7 vertebral body or an upper endplate of a biomechanical environment corresponding to a C3 mid-vertebral body in a cervical spine level of the spine of the subject. In some embodiments, the one or more representative slices include a representative slice located at or adjacent to an apical segment of a thoracic spine level of the spine of the subject. In some embodiments, the apical segment of the spine is at or adjacent to a T8, T7, T6, or T5 vertebral body. In some embodiments, the one or more representative slices include a representative slice located at or adjacent to an upper end plate of a biomechanical environment corresponding to an L4 vertebral body in a lumbar spine level of the subject.

At step 630, a muscle segmentation model may segment each representative slice. Segmenting a representative slice may include generating an image mask including pixels in the representative slice corresponding to paraspinal muscle and excluding pixels in the representative slice corresponding to metal artifacts and/or to biological matter other than paraspinal muscle.

To segment a representative slice, any suitable muscle segmentation model may be used, including but not limited to embodiments of the above-described muscle segmentation model 220. In some embodiments, the muscle segmentation model has been trained to exclude the pixels corresponding to metal artifacts using a training dataset that includes one or more slices to which metal artifacts are synthetically added. In some embodiments, at least some of the representative slices 215 include metal artifacts (e.g., because a metallic implant or other device was present in the subject's spine or another portion of the subject's body at the time the MRI image slices 115 were generated). In some embodiments, the image mask generated for a given representative slice 215 isolates the pixels corresponding to the paraspinal muscle (e.g., all the pixels corresponding to the paraspinal muscle, or more than 99%, 98%, 95%, 90%, 85%, or 80% of the pixels corresponding the paraspinal muscle) from the pixels corresponding to the metal artifacts and from the pixels corresponding to biological matter other than paraspinal muscle (e.g., all the pixels corresponding to metal artifacts and/or biological matter other than paraspinal muscle, or more than 99%, 98%, 95%, 90%, 85%, or 80% of the pixels corresponding to metal artifacts and/or biological matter other than paraspinal muscle).

At step 640, a measurement extraction model 230 may extract measurements of one or more parameters of the subject's paraspinal muscle based on the pixels included in the generated image mask of each of the representative slices. In some embodiments, the one or more parameters include functional cross section area (FCSA), fatty infiltration (FI), fat distribution, Sobel index, and/or paraspinal muscle quality (PMQ).

In some embodiments, the method 600 further includes a step of characterizing a degree of sarcopenia in the subject based on the extracted measurements. In some embodiments, the measured parameters include FCSA and FI, and the method 600 further includes a step of predicting lower back pain in the subject based on the measurements of FCSA and FI.

In some embodiments, the measured parameters include fat distribution and FI within posterior paraspinal muscles of the subject, and the method further includes assessing a state of at least one degenerative disease in the subject based on the extracted measurements of fat distribution and FL. In some embodiments, the at least one degenerative disease includes spinal stenosis, facet degeneration, spinal instability, or spinal deformity.

In some embodiments, the measured parameters include FI in a lumbar multifidus (MF) muscle group of the subject and FI in an erector spinae (ES) muscle group of the subject, and the method further includes a step of predicting an outcome of a lumbar spinal fusion procedure on the subject based on the extracted measurements of FI in the lumbar MF muscle group and FI in the ES muscle group. In some embodiments, a negative impact on the outcome of the lumbar spinal fusion procedure is predicted if the extracted measurement of FI in the lumbar MF muscle group is at least 60% and the extracted measurement of FI in the ES muscle group is at least 40%.

Some non-limiting examples of clinical uses for measurements of paraspinal muscle parameters are described in the publications listed below, each of which is hereby incorporated by reference herein. The inventors have recognized and appreciated that the techniques described herein can be used to measure paraspinal muscle parameters for these and other clinical applications.

M. Muellner, A. Hughes, et al. Changes of the posterior paraspinal and psoas muscle in patients with low back pain: a 3-year longitudinal study. Eur Spine J. 2023 Jun. 28. doi: 10.1007/s00586-023-07814-1. Online ahead of print. PMID: 37378708.

L. Schönnagel, A. Hughes, et al. Abdominal aortic calcification is independently associated with increased atrophy and fatty infiltration of the lumbar paraspinal muscles: a retrospective cross-sectional study. Eur Spine J. 2023 Jun. 5. doi: 10.1007/s00586-023-07783-5. Online ahead of print. PMID: 37273032.

H. Haffer, A. Hughes, et al. Changes in psoas and posterior paraspinal muscle morphology after standalone lateral lumbar interbody fusion: a quantitative MRI-based analysis. Eur Spine J. 2023 May; 32(5):1704-1713. doi: 10.1007/s00586-023-07579-7. Epub 2023 Mar. 8. PMID: 36884111.

M. Muellner, A. Hughes, et al. The association between paraspinal muscle parameters and vertebral pedicle microstructure in patients undergoing lumbar fusion surgery. Int Orthop. 2023 April; 47(4):1051-1060. doi: 10.1007/s00264-022-05659-9. Epub 2022 Dec. 23. PMID: 36562815.

M. Moser, A. Hughes, et al. Differences in lumbar paraspinal muscle morphology in patients with sagittal malalignment undergoing posterior lumbar fusion surgery. Eur Spine J. 2022 November; 31(11):3109-3118. doi: 10.1007/s00586-022-07351-3. Epub 2022 Aug. 29. PMID: 36038784.

M. Muellner, A. Hughes, et al. The effect of age on psoas and paraspinal muscle morphology in patients undergoing posterior lumbar fusion surgery. Eur Spine J. 2022 October; 31(10):2619-2628. doi: 10.1007/s00586-022-07346-0. Epub 2022 Aug. 19. PMID: 35984509.

M. Muellner, A. Hughes, et al. Paraspinal musculature impairment is associated with spinopelvic and spinal malalignment in patients undergoing lumbar fusion surgery. Spine J. 2022 December; 22(12):2006-2016. doi: 10.1016/j.spinee.2022.07.103. Epub 2022 Aug. 6. PMID: 35944826.

E. Chiapparelli, A. Hughes, et al. The association between lumbar paraspinal muscle functional cross-sectional area on MRI and regional volumetric bone mineral density measured by quantitative computed tomography. Osteoporos Int. 2022 December; 33(12):2537-2545. doi: 10.1007/s00198-022-06430-x. Epub 2022 Aug. 6. PMID: 35933479.

M. Moser, A. Hughes, et al. The predictive value of psoas and paraspinal muscle parameters measured on MRI for severe cage subsidence after standalone lateral lumbar interbody fusion. Spine J. 2023 January; 23(1):42-53. doi: 10.1016/j.spinee.2022.03.009. Epub 2022 Mar. 26. PMID: 35351664.

Data and Examples

Improvement in Accuracy through Slice Selection

Referring to Table 1 below, the inventors have collected experimental data illustrating the extent to which some embodiments of the slice selection techniques described herein can enhance the accuracy of measurements of paraspinal muscle parameters. In Table 1, the second column indicates the median total cross-sectional area (CSA) of three different muscle groups (psoas, ES, and MF), as measured using MRI image slices at or adjacent to the L1, L2, L3, L4, and L5 vertebral bodies of the lumbar spine. As the third column shows, in each case, the measurements extracted from the L4 slice are the most accurate. For psoas total CSA, the measurements extracted from the L1 slice are equally accurate, but the measurements extracted from the L2, L3, and L5 slices introduce relative error ranging from 15% to 61%. For ES total CSA, the measurements extracted from the L1, L2, L3, and L5 slices introduce relative error ranging from 4% to 27%. For MF total CSA, the measurements extracted from the L1, L2, L3, and L5 slices introduce relative error ranging from 27% to 70%.

In Table 1, the fourth column indicates the median functional cross-sectional area (CSA) of three different muscle groups (psoas, ES, and MF), as measured using MRI image slices at or adjacent to the L1, L2, L3, L4, and L5 vertebral bodies of the lumbar spine. As the fifth column shows, in each case, the measurements extracted from the L4 slice are the most accurate. For psoas functional CSA, the measurements extracted from the L1 slice are equally accurate, but the measurements extracted from the L2, L3, and L5 slices introduce relative error ranging from 16% to 63%. For ES functional CSA, the measurements extracted from the L1, L2, L3, and L5 slices introduce relative error ranging from 7% to 42%. For MF functional CSA, the measurements extracted from the L1, L2, L3, and L5 slices introduce relative error ranging from 18% to 58%.

In Table 1, the sixth column indicates the median fatty infiltration (MI) of three different muscle groups (psoas, ES, and MF), as measured using MRI image slices at or adjacent to the L1, L2, L3, L4, and L5 vertebral bodies of the lumbar spine. As the seventh column shows, in each case, the measurements extracted from the L4 slice are the most accurate. For psoas FI, the measurements extracted from the L1 slice are equally accurate, but the measurements extracted from the L2, L3, and L5 slices introduce relative error ranging from 11% to 47%. For ES FI, the measurements extracted from the L1, L2, L3, and L5 slices introduce relative error ranging from 9% to 31%. For MF FI, the measurements extracted from the L1, L2, L3, and L5 slices introduce relative error ranging from 13% to 27%.

mask 750 is suitable for extracting accurate measurements of the subject's paraspinal muscle parameters, despite the presence of the metallic spinal implants.

Referring to Table 2 below, the inventors have collected experimental data illustrating the extent to which some embodiments of the muscle segmentation model 450 can reduce the error in measurements of various paraspinal muscle parameters for subjects whose spinal MRI slices exhibit metal artifacts. In Table 2, the second column indicates the median and inter-quartile range (IQR) values for total cross-sectional area (CSA) of three different muscle groups (psoas, ES, and MF), as measured using MRI image slices selected by an embodiment of the slice selection model 350. As the third column shows, the use of the muscle segmentation model 450 reduces the error in the extracted measurements by 5-11%. In the example of Table 2, for psoas total CSA, ES total CSA, and MF total CSA, the muscle segmentation model 450 reduces the measurement error by 5.1%, 10.5%, and 11.1%, respectively.

In Table 2, the fourth column indicates the median and IQR values for functional CSA of three different muscle

TABLE 1

|    | Psoas total CSA (median) | Percent Error relative to L4 | Psoas functional CSA (median) | Percent Error relative to L4 | Psoas FI (Median, IQR) | Percent Error relative to L4 |
|----|---|---|---|---|---|---|
| L1 | NA | — | NA | — | NA (NA-NA) | — |
| L2 | 842.1 | 61.64% | 757 | 62.64% | 0.066 (0.07-0.066) | 46.67% |
| L3 | 1539.9 | 29.86% | 1383.2 | 31.73% | 0.058 (0.06-0.0578) | 28.89% |
| L4 | 2195.5 | — | 2026.2 | — | 0.045 (0.04-0.0449) | — |
| L5 | 2532.1 | 15.33% | 2347.4 | 15.85% | 0.05 (0.05-0.0502) | 11.11% |

|    | ES total CSA (median) | Percent Error relative to L4 | ES functional CSA (median) | Percent Error relative to L4 | ES FI (Median, IQR) | Percent Error relative to L4 |
|----|---|---|---|---|---|---|
| L1 | 4060.7 | 8.94% | 2872.85 | 26.64% | 0.281 (0.28-0.2806) | 31.30% |
| L2 | 4106.8 | 10.17% | 2692.6 | 18.70% | 0.323 (0.32-0.3228) | 21.03% |
| L3 | 3887.25 | 4.28% | 2438.5 | 7.49% | 0.374 (0.37-0.3743) | 8.56% |
| L4 | 3727.6 | — | 2268.5 | — | 0.409 (0.41-0.4087) | — |
| L5 | 2729.5 | 26.78% | 1326.8 | 41.51% | 0.506 (0.51-0.5065) | 23.72% |

|    | MF total CSA (median) | Percent Error relative to L4 | MF functional CSA (median) | Percent Error relative to L4 | MF FI (Median, IQR) | Percent Error relative to L4 |
|----|---|---|---|---|---|---|
| L1 | 480.45 | 70.21% | 298.85 | 58.17% | 0.397 (0.4-0.3973) | 27.16% |
| L2 | 702.8 | 56.42% | 410.7 | 42.52% | 0.421 (0.42-0.4205) | 22.75% |
| L3 | 1089.45 | 32.44% | 587.45 | 17.78% | 0.474 (0.47-0.4736) | 13.03% |
| L4 | 1612.6 | — | 714.5 | — | 0.545 (0.54-0.5448) | — |
| L5 | 2053.6 | 27.35% | 889.9 | 24.55% | 0.581 (0.58-0.5814) | 6.61% |

Improvement in Accuracy through Metal Subtraction

Figure 7A:
FIG. 7A is an axial MRI image slice of a subject's spine.

Referring to FIG. 7A, an axial MRI image slice 700 of a subject's spine is shown. In the example of FIG. 7A, the subject has metallic spinal implants (782, 784). As can be seen, the pixels surrounding the metallic implants in the MRI slice 700 are much lighter than the adjacent tissue. As noted above, this "halo effect" can lead to erroneous measurements of paraspinal muscle parameters if the pixels affected by the metallic implants are mistakenly processed as pixels representing paraspinal muscle.

Figure 7B:
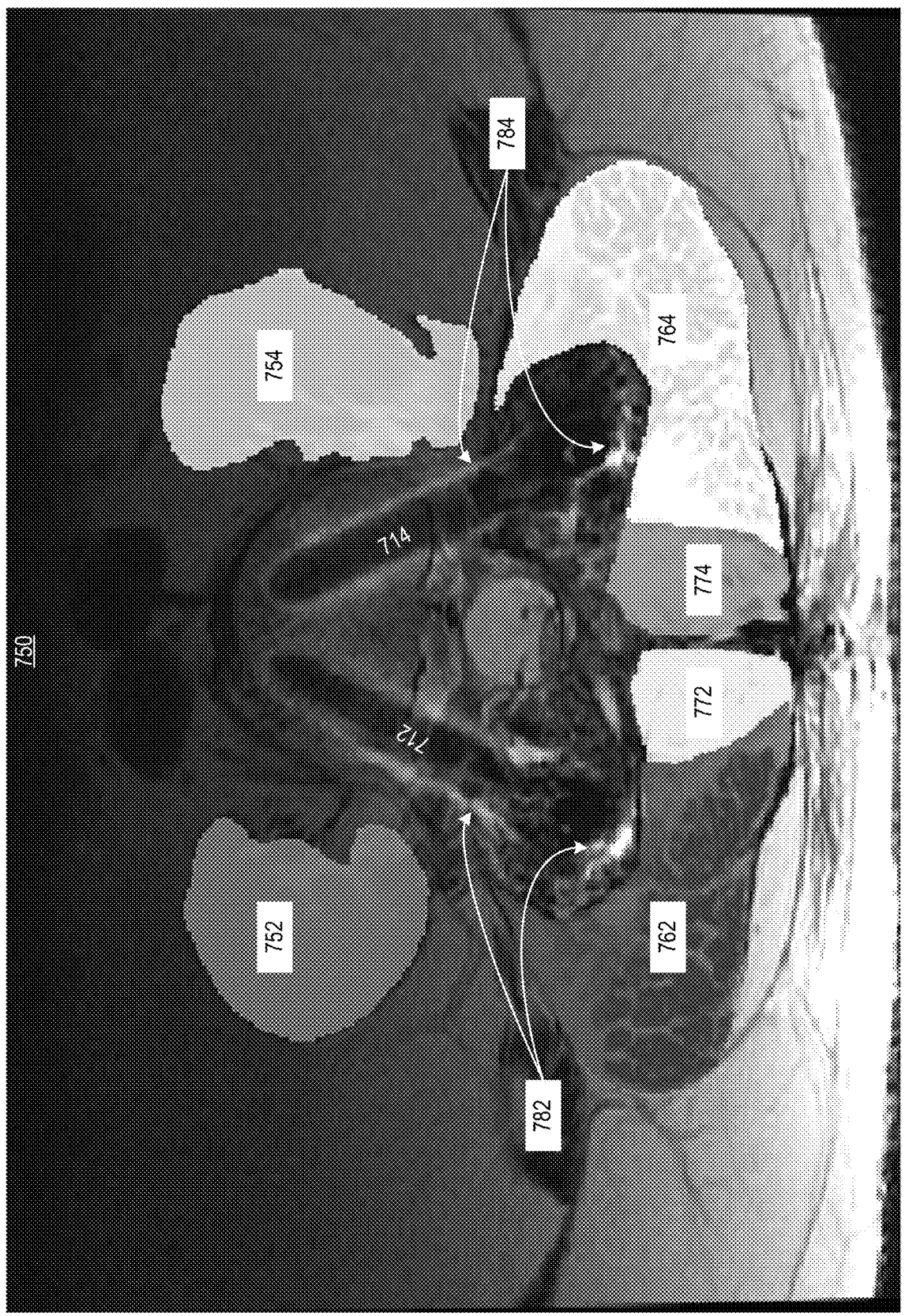
FIG. 7B is the axial MRI image slice of FIG. 7A, with an image segmentation mask.

Referring to FIG. 7B, the axial MRI image slice 700 of FIG. 7A is shown, with a segmentation mask 750 generated using an embodiment of the above-described muscle segmentation model 450. The segmentation mask 750 correctly differentiates the psoas muscles (752, 754), erector spinae muscles (762, 764), and multifidus muscles (772, 774). In addition, the segmentation mask 750 correctly excludes not only the metallic spinal implants (712, 714) but also the discolored pixels (782, 784) arising from the halo effect generated by the spinal implants. Thus, the segmentation groups (psoas, ES, and MF), as measured using MRI image slices selected by an embodiment of the slice selection model 350. As the fifth column shows, the use of the muscle segmentation model 450 reduces the error in the extracted measurements by 5-14%. Specifically, in the example of Table 2, for psoas functional CSA, ES functional CSA, and MF functional CSA, the muscle segmentation model 450 reduces the measurement error by 5.2%, 10.4%, and 14.5%, respectively.

In Table 2, the sixth column indicates the median and IQR values for fatty infiltration (FI) of three different muscle groups (psoas, ES, and MF), as measured using MRI image slices selected by an embodiment of the slice selection model 350. As the seventh column shows, the use of the muscle segmentation model 450 reduces the error in the extracted measurements by 3-11%. Specifically, in the example of Table 2, for psoas FI, ES FI, and MF FI, the muscle segmentation model 450 reduces the measurement error by 10.7%, 8.5%, and 2.7%, respectively.

TABLE 2

|  | Total Psoas total CSA (Median, IQR) | Percent Error | Total Psoas functional CSA (Median, IQR) | Percent Error | Total Psoas FI (Median, IQR) | Percent Error |
| --- | --- | --- | --- | --- | --- | --- |
| AI Generated | 2523.3 (2523.3-2523.3) | 5.09% | 2471.8 (2471.8-2471.8) | 5.16% | 0.031 (0.03-0.0306) | 10.71% |
| AI Generated with Metal Calibration | 2401.1 (2401.1-2401.1) |  | 2350.5 (2350.5-2350.5) |  | 0.028 (0.03-0.0285) |  |

|  | Total Erector Spinae total CSA (Median, IQR) | Percent Error | Total Erector Spinae functional CSA (Median, IQR) | Percent Error | Total Erector Spinae FI (Median, IQR) | Percent Error |
| --- | --- | --- | --- | --- | --- | --- |
| AI Generated | 4198.5 (4198.5-4198.5) | 10.55% | 2082.9 (2082.9-2082.9) | 10.36% | 0.45 (0.45-0.4503) | 8.54% |
| AI Generated with Metal Calibration | 3797.9 (3797.9-3797.9) |  | 1887.3 (1887.3-1887.3) |  | 0.492 (0.49-0.4924) |  |

|  | Total Multifidus total CSA (Median, IQR) | Percent Error | Total Multifidus functional CSA (Median, IQR) | Percent Error | Total Multifidus FI (Median, IQR) | Percent Error |
| --- | --- | --- | --- | --- | --- | --- |
| AI Generated | 1281.1 (1281.1-1281.1) | 11.14% | 463.2 (463.2-463.2) | 14.48% | 0.674 (0.67-0.674) | 2.74% |
| AI Generated with Metal Calibration | 1152.7 (1152.7-1152.7) |  | 404.6 (404.6-404.6) |  | 0.656 (0.66-0.6564) |  |

Additional Embodiments

FIG. 8 is a block diagram of an example computer system 800 that may be used in implementing the technology described in this document. General-purpose computers, network appliances, mobile devices, or other electronic systems may also include at least portions of the system 800. The system 800 includes a processor 810, a memory 820, a storage device 830, and an input/output device 840. Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. In some implementations, the processor 810 is a programmable (or reprogrammable) general purpose microprocessor or microcontroller. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In addition, programs that implement various aspects of some embodiments may be accessed from a remote location (e.g., a server) over a network. Such data and/or programs may be conveyed through any of a variety of machine-readable medium including, but not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

In embodiments, aspects of the techniques described herein (e.g., training a risk assessment model, using a risk assessment model to assess the risk associated with a commit request, performing one or more (e.g., all) of the steps of the methods described herein, etc.) may be implemented using machine learning and/or artificial intelligence technologies.

"Machine learning" generally refers to the application of certain techniques (e.g., pattern recognition and/or statistical inference techniques) by computer systems to perform specific tasks. Machine learning techniques may be used to build models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. A value of a feature may be a measurement of the corresponding property of an entity or an instance of information regarding an entity. Features can also have data types. For instance, a feature can have an image data type, a numerical data type, a text data type (e.g., a structured text data type or an unstructured ("free") text data type), a categorical data type, or any other suitable data type. In general, a feature's data type is categorical if the set of values that can be assigned to the feature is finite.

As used herein, "model" may refer to any suitable model artifact generated by the process of using a machine learning algorithm to fit a model to a specific training data set. The terms "model," "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

"Artificial intelligence" (AI) generally encompasses any technology that demonstrates intelligence. Applications (e.g., machine-executed software) that demonstrate intelligence may be referred to herein as "artificial intelligence applications," "AI applications," or "intelligent agents." An intelligent agent may demonstrate intelligence, for example, by perceiving its environment, learning, and/or solving problems (e.g., taking actions or making decisions that increase the likelihood of achieving a defined goal). In many cases, intelligent agents are developed by organizations and deployed on network-connected computer systems so users within the organization can access them. Intelligent agents are used to guide decision-making and/or to control systems in a wide variety of fields and industries, e.g., security; transportation; risk assessment and management; supply chain logistics; and energy management. Intelligent agents may include or use models.

Some non-limiting examples of AI application types may include inference applications, comparison applications, and optimizer applications. Inference applications may include any intelligent agents that generate inferences (e.g., predictions, forecasts, etc.) about the values of one or more output variables based on the values of one or more input variables. In some examples, an inference application may provide a recommendation based on a generated inference. For example, an inference application for a lending organization may infer the likelihood that a loan applicant will default on repayment of a loan for a requested amount, and may recommend whether to approve a loan for the requested amount based on that inference. Comparison applications may include any intelligent agents that compare two or more possible scenarios. Each scenario may correspond to a set of potential values of one or more input variables over a period of time. For each scenario, an intelligent agent may generate one or more inferences (e.g., with respect to the values of one or more output variables) and/or recommendations. For example, a comparison application for a lending organization may display the organization's predicted revenue over a period of time if the organization approves loan applications if and only if the predicted risk of default is less than 20% (scenario #1), less than 10% (scenario #2), or less than 5% (scenario #3). Optimizer applications may include any intelligent agents that infer the optimum values of one or more variables of interest based on the values of one or more input variables. For example, an optimizer application for a lending organization may indicate the maximum loan amount that the organization would approve for a particular customer.

As used herein, "data analytics" may refer to the process of analyzing data (e.g., using machine learning models, artificial intelligence, models, or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

Data analytics tools are used to guide decision-making and/or to control systems in a wide variety of fields and industries, e.g., security; transportation; risk assessment and management; supply chain logistics; and energy management. The processes used to develop data analytics tools suitable for carrying out specific data analytics tasks generally include steps of data collection, data preparation, feature engineering, model generation, and/or model deployment.

Some Embodiments

Some embodiments may include any of the following:

(A1) A method for measuring paraspinal muscle parameters, the method comprising: obtaining a plurality of magnetic resonance imaging (MRI) 2-dimensional image slices 115 of a spine of a subject; identifying, by a slice selection model 210, one or more representative slices 215 in the plurality of MRI slices 115, each of the one or more representative slices being located at or adjacent to a specified physiological region corresponding to a specific biomechanical environment in a respective spine level of the spine of the subject; segmenting, by a muscle segmentation model 220, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and extracting, by a measurement extraction model 230, one or more measurements of one or more respective parameters of the paraspinal muscle of the subject based on the plurality of pixels included in the generated image segmentation mask of each of the one or more representative slices.

(A2) The method of A1, wherein the slice selection model 210 is configured to identify each of the one or more representative slices 215 using a many-to-one slices-to-probability approach.

(A3) The method of A1 or A2, wherein the muscle segmentation model 220 is trained to exclude the plurality of pixels corresponding to metal artifacts using a training dataset comprising one or more slices to which metal artifacts are synthetically added.

(A4) The method of any of A1-A3, wherein the one or more representative slices include a first representative slice located at or adjacent to an upper endplate of a biomechanical environment corresponding to a C7 vertebral body or an upper endplate of a biomechanical environment corresponding to a C3 mid-vertebral body in a cervical spine level of the spine of the subject.

(A5) The method of any of A1-A4, wherein the one or more representative slices include a second representative slice located at or adjacent to an apical segment of a thoracic spine level of the spine of the subject.

(A6) The method of A5, wherein the apical segment of the spine is at or adjacent to a T8, T7, T6, or T5 vertebral body.

(A7) The method of any of A1-A6, wherein the one or more representative slices include a third representative slice located at or adjacent to an upper end plate of a biomechanical environment corresponding to an L4 vertebral body in a lumbar spine level of the subject.

(A8) The method of any of A1-A7, wherein the one or more parameters of the paraspinal muscle of the subject include functional cross section area (FCSA), fatty infiltration (FI), fat distribution, Sobel index, and/or paraspinal muscle quality (PMQ).

(A9) The method of A8, further comprising characterizing a degree of sarcopenia in the subject based on the extracted measurements of the one or more parameters.

(A10) The method of any of A1-A7, wherein the one or more parameters of the paraspinal muscle of the subject include functional cross section area (FCSA) and fatty infiltration (FI), the method further comprising predicting lower back pain in the subject based on the extracted measurements of FCSA and FI.

(A11) The method of any of A1-A7, wherein the one or more parameters of the paraspinal muscle of the subject include fat distribution and fatty infiltration (FI) within posterior paraspinal muscles of the subject, the method further comprising assessing a state of at least one degenerative disease in the subject based on the extracted measurements of fat distribution and FI within posterior paraspinal muscles of the subject.

(A12) The method of A11, wherein the at least one degenerative disease includes spinal stenosis, facet degeneration, spinal instability, or spinal deformity.

(A13) The method of any of A1-A7, wherein the one or more parameters of the paraspinal muscle of the subject include first fatty infiltration (FI) in a lumbar multifidus (MF) muscle group of the subject and second FI in an erector spinae (ES) muscle group of the subject, the method further comprising predicting an outcome of a lumbar spinal fusion procedure on the subject based on the extracted measurements of first FI and second FI.

(A14) The method of A13, wherein predicting the outcome of the lumbar spinal fusion procedure comprises predicting a negative impact on the outcome of the lumbar spinal fusion procedure based on the extracted measurement of first FI being at least 60% and the extracted measurement of second FI being at least 40%.

(A15) The method of any of A1-A14, wherein the slice selection model comprises a first stage and a second stage.

(A16) The method of A15, wherein the first stage of the slice selection model comprises a 2-dimensional convolutional neural network (CNN), a transformer, an auto-encoder, and/or an encoder-decoder architecture.

(A17) The method of A15 or A16, wherein the second stage of the slice selection model comprises a recurrent neural network (RNN), a transformer, a fully connected neural network, or a deep neural network.

(A18) The method of A17, wherein the RNN has an iterative network architecture.

(A19) The method of any of A15-A18, wherein the plurality of MRI slices includes one or more sets of MRI slices corresponding to one or more respective spine levels of the spine of the subject, and wherein identifying the one or more representative slices in the plurality of MRI slices comprises: generating, by the first stage of the slice selection model, respective encodings for each of the image slices in the plurality of image slices; and for each of the one more sets of MRI slices, selecting, by the second stage of the slice selection model, the representative slice located at or adjacent to the specified physiological region corresponding to the specific biomechanical environment in the respective spine level of the spine of the subject, wherein the selecting of each representative slice in each respective spine level is based on the encodings of the image slices in the plurality of image slices.

(A20) The method of A19, wherein the selecting of each representative slice in each respective spine level is further based on an ordering of the image slices in the plurality of image slices.

(A21) The method of A19 or A20, wherein the selecting of each representative slice in each respective spine level is further based on one or more contextual features indicating one or more attributes of the subject.

(A22) The method of A15, wherein the slice selection model is a Siamese neural network model, the first stage of the slice selection model comprises twin neural networks, and the second stage of the slice selection model is configured to determine a distance and/or a similarity between a slice included in the plurality of MRI slices and a reference slice.

(A23) The method of A15, wherein the slice selection model is a Vision Transformer model, the first stage of the slice selection model is configured to perform linear projection of an input image slice, and the second stage of the slice selection model comprises a plurality of classification heads.

(A24) The method of any of A1-A14, wherein the slice selection model comprises one or more stages.

(A25) The method of any of A1-24, wherein the muscle segmentation model comprises a U-net based convolutional neural network (CNN) model.

(A26) The method of A25, wherein the U-net based CNN model includes a plurality of first stages, wherein each of the first stages includes a plurality of convolutional layers 452 and a downsampling layer 454.

(A27) The method of A23 or A26, wherein the U-net based CNN model includes a plurality of second stages, wherein each of the second stages includes a plurality of convolutional layers 462 and an upsampling layer 464.

(A28) The method of any of A1-A27, wherein at least a subset of the 2-dimensional image slices of the spine of the subject includes metal artifacts.

(A29) The method of A28, wherein for each representative slice, the respective image segmentation mask isolates the plurality of pixels corresponding to the paraspinal muscle from the plurality of pixels corresponding to the metal artifacts and from the plurality of pixels corresponding to biological matter other than the paraspinal muscle.

(A30) The method of A1, wherein the paraspinal muscle contains fat, and wherein the plurality of pixels in the respective representative slice corresponding to paraspinal muscle include one or more pixels corresponding to the contained fat.

(A31) The method of A2, wherein using a many-to-one slices-to-probability approach comprises using each image slice in the plurality of image slices 115 to select the one or more representative slices.

(A32) The method of A1, wherein the muscle segmentation model 220 is trained to exclude the plurality of pixels corresponding to metal artifacts using transfer learning with a training dataset comprising one or more slices in which true metal artifacts are present.

(A33) A system for measuring paraspinal muscle parameters, the system comprising: one or more processing devices; and one or more memory devices storing instructions which, when executed by the one or more processing devices, cause the system to perform operations including: obtaining a plurality of magnetic resonance imaging (MRI) 2-dimensional image slices 115 of a spine of a subject; identifying, by a slice selection model 210, one or more representative slices 215 in the plurality of MRI slices 115, each of the one or more representative slices being located at or adjacent to a specified physiological region corresponding to a specific biomechanical environment in a respective spine level of the spine of the subject; segmenting, by a muscle segmentation model 220, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and extracting, by a measurement extraction model 230, one or more measurements of one or more respective parameters of the paraspinal muscle of the subject based on the plurality of pixels included in the generated image segmentation mask of each of the one or more representative slices.

(A34) The system of A33, further comprising a magnetic resonance imaging (MRI) scanner configured to generate the 2-dimensional image slices of the spine of the subject.

(A35) A computer-readable storage medium storing instructions that are configured, when executed by one or more processing devices of a system, to cause the system to perform operations including: obtaining a plurality of magnetic resonance imaging (MRI) 2-dimensional image slices 115 of a spine of a subject; identifying, by a slice selection model 210, one or more representative slices 215 in the plurality of MRI slices 115, each of the one or more representative slices being located at or adjacent to a specified physiological region corresponding to a specific biomechanical environment in a respective spine level of the spine of the subject; segmenting, by a muscle segmentation model 220, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and extracting, by a measurement extraction model 230, one or more measurements of one or more respective parameters of the paraspinal muscle of the subject based on the plurality of pixels included in the generated image segmentation mask of each of the one or more representative slices.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for measuring paraspinal muscle parameters, the method comprising:
    obtaining a plurality of magnetic resonance imaging (MRI) 2-dimensional image slices of a spine of a subject;
    identifying, by a slice selection model, one or more representative slices in the plurality of MRI slices, each of the one or more representative slices being located at or adjacent to a specified physiological region corresponding to a specific biomechanical environment in a respective spine level of the spine of the subject, wherein the slice selection model comprises a first stage and a second stage, and wherein the plurality of MRI slices includes one or more sets of MRI slices corresponding to one or more respective spine levels of the spine of the subject, and wherein identifying the one or more representative slices in the plurality of MRI slices comprises:
        (i) generating, by the first stage of the slice selection model, respective encodings for each of the MRI slices in the plurality of MRI slices; and
        (ii) for each of the one more sets of MRI slices, selecting, by the second stage of the slice selection model, a respective representative slice located at or adjacent to the specified physiological region corresponding to the specific biomechanical environment in the respective spine level of the spine of the subject, wherein the selecting of each representative slice in each respective spine level is based on the encodings of the MRI slices in the plurality of MRI slices;
    segmenting, by a muscle segmentation model, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and
    extracting, by a measurement extraction model, one or more measurements of one or more respective parameters of the paraspinal muscle of the subject based on the plurality of pixels included in the generated image segmentation mask of each of the one or more representative slices.

2. The method of claim 1, wherein the slice selection model is configured to identify each of the one or more representative slices using a many-to-one slices-to-probability approach.

3. The method of claim 1, wherein the muscle segmentation model is trained to exclude the plurality of pixels corresponding to metal artifacts using a training dataset comprising one or more slices to which metal artifacts are synthetically added.

4. The method of claim 1, wherein the one or more representative slices include a first representative slice located at or adjacent to an upper endplate of a biomechanical environment corresponding to a C7 vertebral body or an upper endplate of a biomechanical environment corresponding to a C3 mid-vertebral body in a cervical spine level of the spine of the subject.

5. The method of claim 1, wherein the one or more representative slices include a second representative slice located at or adjacent to an apical segment of a thoracic spine level of the spine of the subject.

6. The method of claim 5, wherein the apical segment of the spine is at or adjacent to a T8, T7, T6, or T5 vertebral body.

7. The method of claim 1, wherein the one or more representative slices include a third representative slice located at or adjacent to an upper end plate of a biomechanical environment corresponding to an L4 vertebral body in a lumbar spine level of the subject.

8. The method of claim 1, wherein the one or more parameters of the paraspinal muscle of the subject include functional cross section area (FCSA), fatty infiltration (FI), fat distribution, Sobel index, and/or paraspinal muscle quality (PMQ).

9. The method of claim 8, further comprising characterizing a degree of sarcopenia in the subject based on the extracted measurements of the one or more parameters.

10. The method of claim 1, wherein the one or more parameters of the paraspinal muscle of the subject include functional cross section area (FCSA) and fatty infiltration (FI), the method further comprising predicting lower back pain in the subject based on the extracted measurements of FCSA and FI.

11. The method of claim 1, wherein the one or more parameters of the paraspinal muscle of the subject include fat distribution and fatty infiltration (FI) within posterior paraspinal muscles of the subject, the method further comprising assessing a state of at least one degenerative disease in the subject based on the extracted measurements of fat distribution and FI within posterior paraspinal muscles of the subject.

12. The method of claim 11, wherein the at least one degenerative disease includes spinal stenosis, facet degeneration, spinal instability, or spinal deformity.

13. The method of claim 1, wherein the one or more parameters of the paraspinal muscle of the subject include first fatty infiltration (FI) in a lumbar multifidus (MF) muscle group of the subject and second FI in an erector spinae (ES) muscle group of the subject, the method further comprising predicting an outcome of a lumbar spinal fusion procedure on the subject based on the extracted measurements of first FI and second FI.

14. The method of claim 13, wherein predicting the outcome of the lumbar spinal fusion procedure comprises predicting a negative impact on the outcome of the lumbar spinal fusion procedure based on the extracted measurement of first FI being at least 60% and the extracted measurement of second FI being at least 40%.

15. The method of claim 1, wherein the first stage of the slice selection model comprises a 2-dimensional convolutional neural network (CNN), a transformer, an auto-encoder, and/or an encoder-decoder architecture.

16. The method of claim 1, wherein the second stage of the slice selection model comprises a recurrent neural network (RNN), a transformer, a fully connected neural network, or a deep neural network.

17. The method of claim 1, wherein the selecting of each representative slice in each respective spine level is further based on an ordering of the MRI slices in the plurality of MRI slices.

18. The method of claim 1, wherein the slice selection model is a Siamese neural network model, the first stage of the slice selection model comprises twin neural networks, and the second stage of the slice selection model is configured to determine a distance and/or a similarity between a slice included in the plurality of MRI slices and a reference slice.

19. The method of claim 1, wherein the slice selection model is a Vision Transformer model, the first stage of the slice selection model is configured to perform linear projection of an input MRI slice, and the second stage of the slice selection model comprises a plurality of classification heads.

20. The method of claim 1, wherein the muscle segmentation model comprises a U-net based convolutional neural network (CNN) model.

21. The method of claim 1, wherein at least a subset of the MRI slices of the spine of the subject includes metal artifacts.

22. The method of claim 21, wherein for each representative slice, the respective image segmentation mask isolates the plurality of pixels corresponding to the paraspinal muscle from the plurality of pixels corresponding to the metal artifacts and from the plurality of pixels corresponding to biological matter other than the paraspinal muscle.

23. The method of claim 1, wherein the paraspinal muscle contains fat, and wherein the plurality of pixels in the respective representative slice corresponding to paraspinal muscle include one or more pixels corresponding to the contained fat.

24. The method of claim 2, wherein using a many-to-one slices-to-probability approach comprises using each MRI slice in the plurality of MRI slices to select the one or more representative slices.

25. A system for measuring paraspinal muscle parameters, the system comprising:
    one or more processing devices; and
    one or more memory devices storing instructions which, when executed by the one or more processing devices, cause the system to perform operations including:
        obtaining a plurality of magnetic resonance imaging (MRI) 2-dimensional image slices of a spine of a subject;
        identifying, by a slice selection model, one or more representative slices in the plurality of MRI slices, each of the one or more representative slices being located at or adjacent to a specified physiological region corresponding to a specific biomechanical environment in a respective spine level of the spine of the subject, wherein the slice selection model comprises a first stage and a second stage, and wherein the plurality of MRI slices includes one or more sets of MRI slices corresponding to one or more respective spine levels of the spine of the subject, and wherein identifying the one or more representative slices in the plurality of MRI slices comprises:
            (i) generating, by the first stage of the slice selection model, respective encodings for each of the MRI slices in the plurality of MRI slices; and
            (ii) for each of the one more sets of MRI slices, selecting, by the second stage of the slice selection model, a respective representative slice located at or adjacent to the specified physiological region corresponding to the specific biomechanical environment in the respective spine level of the spine of the subject, wherein the selecting of each representative slice in each respective spine level is based on the encodings of the MRI slices in the plurality of MRI slices;
        segmenting, by a muscle segmentation model, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and
        extracting, by a measurement extraction model, one or more measurements of one or more respective parameters of the paraspinal muscle of the subject based on the plurality of pixels included in the generated image segmentation mask of each of the one or more representative slices.

26. The system of claim 25, further comprising a magnetic resonance imaging (MRI) scanner configured to generate the MRI slices of the spine of the subject.

27. A computer-readable storage medium storing instructions that are configured, when executed by one or more processing devices of a system, to cause the system to perform operations including:

obtaining a plurality of magnetic resonance imaging (MRI) 2-dimensional image slices of a spine of a subject;

identifying, by a slice selection model, one or more representative slices in the plurality of MRI slices, each of the one or more representative slices being located at or adjacent to a specified physiological region corresponding to a specific biomechanical environment in a respective spine level of the spine of the subject, wherein the slice selection model comprises a first stage and a second stage, and wherein the plurality of MRI slices includes one or more sets of MRI slices corresponding to one or more respective spine levels of the spine of the subject, and wherein identifying the one or more representative slices in the plurality of MRI slices comprises:

(i) generating, by the first stage of the slice selection model, respective encodings for each of the MRI slices in the plurality of MRI slices; and (ii) for each of the one more sets of MRI slices, selecting, by the second stage of the slice selection model, a respective representative slice located at or adjacent to the specified physiological region corresponding to the specific biomechanical environment in the respective spine level of the spine of the subject, wherein the selecting of each representative slice in each respective spine level is based on the encodings of the MRI slices in the plurality of MRI slices;

segmenting, by a muscle segmentation model, each respective representative slice of the one or more representative slices, wherein segmenting each respective representative slice includes generating an image segmentation mask including a plurality of pixels in the respective representative slice corresponding to paraspinal muscle and excluding a plurality of pixels in the respective representative slice corresponding to metal artifacts and/or to biological matter of the subject other than paraspinal muscle; and extracting, by a measurement extraction model, one or more measurements of one or more respective parameters of the paraspinal muscle of the subject based on the plurality of pixels included in the generated image segmentation mask of each of the one or more representative slices.

* * * * *